(12) United States Patent
    Naganuma

(10) Patent No.: US 10,444,880 B2
(45) Date of Patent: Oct. 15, 2019

(54) TOUCH OR PROXIMITY SENSOR AND DISPLAY DEVICE

(71) Applicant: Japan Display Inc., Tokyo (JP)

(72) Inventor: Tomohiko Naganuma, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/810,432

(22) Filed: Nov. 13, 2017

(65) Prior Publication Data
    US 2018/0136769 A1    May 17, 2018

(30) Foreign Application Priority Data
    Nov. 17, 2016  (JP) .................................. 2016-223872

(51) Int. Cl.
    *G06F 3/041*    (2006.01)
    *G06F 3/044*    (2006.01)

(52) U.S. Cl.
    CPC ............ *G06F 3/0412* (2013.01); *G06F 3/044* (2013.01); *G06F 3/0416* (2013.01); *G06F 3/0445* (2019.05); *G06F 3/0448* (2019.05); *G06F 2203/04103* (2013.01); *G06F 2203/04111* (2013.01); *G06F 2203/04112* (2013.01)

(58) Field of Classification Search
    CPC ...... G06F 3/0412; G06F 3/0416; G06F 3/044; G06F 2203/04111; G06F 2203/04103; G06F 2203/04112; G06F 3/0448; G06F 3/0445
    See application file for complete search history.

(56) References Cited

U.S. PATENT DOCUMENTS

| | | | | |
|---|---|---|---|---|
| 7,034,808 B2* | 4/2006 | Sakata | ................... | G06F 3/044 345/173 |
| 2010/0134426 A1* | 6/2010 | Lee | ....................... | G06F 3/0412 345/173 |
| 2013/0154966 A1* | 6/2013 | Kim | ....................... | G06F 3/044 345/173 |
| 2015/0048346 A1* | 2/2015 | Lee | ....................... | H01L 27/323 257/40 |
| 2015/0253912 A1* | 9/2015 | Liu | ........................ | G06F 1/16 345/174 |

FOREIGN PATENT DOCUMENTS

JP    2013-125536 A    6/2013

\* cited by examiner

*Primary Examiner* — Brent D Castiaux
(74) *Attorney, Agent, or Firm* — Michael Best & Friedrich LLP

(57) ABSTRACT

There is provided a touch or proximity sensor including a plurality of first touch electrodes extending in a first direction and being arranged in a second direction intersecting the first direction, and a plurality of second touch electrodes extending in the second direction, being arranged in the first direction, and insulated from the plurality of first touch electrodes, in which at least one of the plurality of first touch electrodes and at least one of the plurality of second touch electrodes respectively have concave surface on a detection surface side.

13 Claims, 35 Drawing Sheets

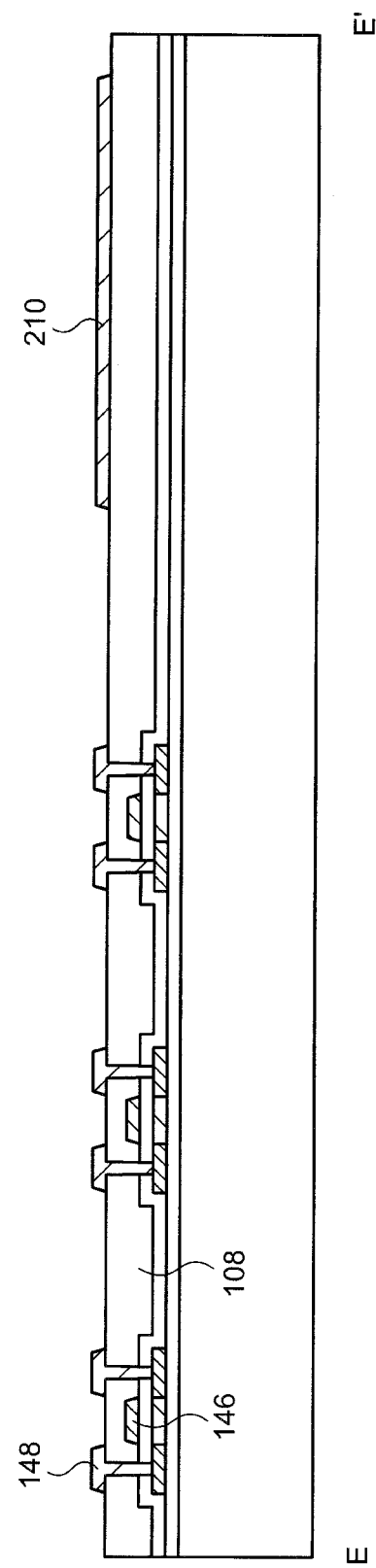

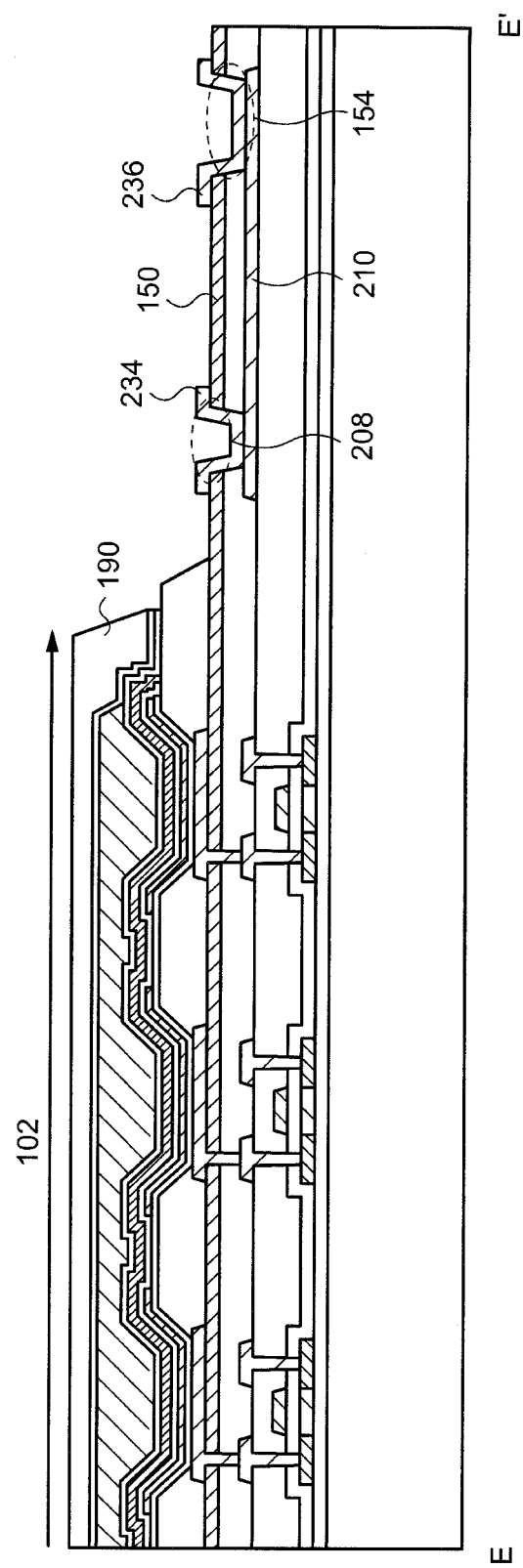

TOUCH OR PROXIMITY SENSOR AND DISPLAY DEVICE

CROSS REFERENCE TO RELATED APPLICATIONS

This application is based upon and claims the benefit of priority from the prior Japanese Patent Application No. 2016-223872 filed on Nov. 17, 2016, the entire contents of which are incorporated herein by reference.

FIELD

The present invention relates to a touch or proximity sensor and a display device loaded with the touch or proximity sensor. More particularly, the present invention relates to an organic Electroluminescence (EL) display device loaded with the touch or proximity sensor, for example.

BACKGROUND

A touch sensor has been known as an interface for a user to input information to a display device. When the touch sensor is installed to overlap a screen of the display device, the user can operate an input button, an icon, and the like displayed on the screen, and can easily input information to the display device.

In recent years, the demand for a so-called hover sensing (non-contact sensing) technique for detecting coordinates projected onto a display screen of a detection target such as a person's finger not contacting the display screen and spaced apart therefrom and a user operating an input button, an icon, or the like displayed on the display screen has increased.

For example, Japanese Laid-Open Patent Publication No. 2013-125536 (Japanese Patent Application No. 2012-75731) discloses a touch panel including a lower transparent substrate having concave portions and convex portions continuously formed therein, a lower detection electrode formed on the lower transparent substrate and formed in one direction to be continuous to the concave portions and the convex portions, an upper transparent substrate having convex portions and concave portions alternating with the the concave portions and the convex portions of the lower transparent substrate, and an upper detection electrode formed on the upper transparent substrate and formed in one direction having the convex portions of the upper transparent substrate respectively corresponding to the concave portions formed in the lower detection electrode.

In the hover sensing, a capacitance between a touch electrode on a display surface and a finger spaced approximately several centimeters apart therefrom is detected. However, in this case, the difficulty of efficiently forming an electric field up to the finger spaced approximately several centimeters apart from a touch sensor makes the hover sensing difficult.

SUMMARY

According to an aspect of the present invention, there is provided a touch or proximity sensor comprising: a plurality of first touch electrodes extending in a first direction and being arranged in a second direction intersecting the first direction; and a plurality of second touch electrodes extending in the second direction, being arranged in the first direction, and insulated from the plurality of first touch electrodes, wherein at least one of the plurality of first touch electrodes and at least one of the plurality of second touch electrodes respectively have concave surface on a detection surface side.

According to another aspect of the present invention, there is provided a display device comprising: A display device comprising: a plurality of pixels arranged in a matrix shape; a plurality of first touch electrodes on the plurality of pixels, the plurality of first touch electrodes extending in a first direction and being arranged in a second direction intersecting the first direction; and a plurality of second touch electrodes on the plurality of pixels, the plurality of second touch electrodes extending in the second direction, being arranged in the first direction, and insulated from the plurality of first touch electrodes, wherein at least one of the plurality of first touch electrodes and at least one of the plurality of second touch electrodes respectively have concave surface on a display surface side.

BRIEF DESCRIPTION OF DRAWINGS

FIG. 11B is a schematic sectional view illustrating the method for manufacturing the display device according to the second embodiment of the present invention;

FIG. 15A is a schematic sectional view illustrating the method for manufacturing the display device according to the second embodiment of the present invention;

DESCRIPTION OF EMBODIMENTS

Hereinafter, each embodiment of the present invention will be described while referencing the drawings. However, the present invention may be implemented in various ways without deviating from the gist, thus interpretation thereof should not be limited to the content exemplified in the embodiments below.

In order to provide a clearer description, a width, thickness, shape, etc. of each component are represented schematically compared with those of the actual modes. These drawings are merely examples and do not limit the interpretation of the present invention. In this specification and each of the drawings, elements similar to previously described elements are marked with the same symbols and detailed descriptions are omitted accordingly.

In the present invention, when one film is processed to form a plurality of films, the plurality of films may respectively have different functions and roles. However, the plurality of films are respectively derived from films formed as the same layer in the same process, and have the same layer structure and the same material. Therefore, the plurality of films are defined as existing in the same layer.

In the scope of the present specification and the claims, expressing a state in which a structure is arranged above another structure is simply described as "above," and unless otherwise noted, includes both cases in which a structure is arranged directly above another structure so as to be touching, and in which a structure is arranged above another structure via further another structure.

The following embodiments are directed to providing a display device loaded with a touch or proximity sensor capable of detecting a detection target not contacting a sensor and spaced apart from the sensor with high accuracy.

(First Embodiment)

[1. Entire Configuration]

Figure 1:
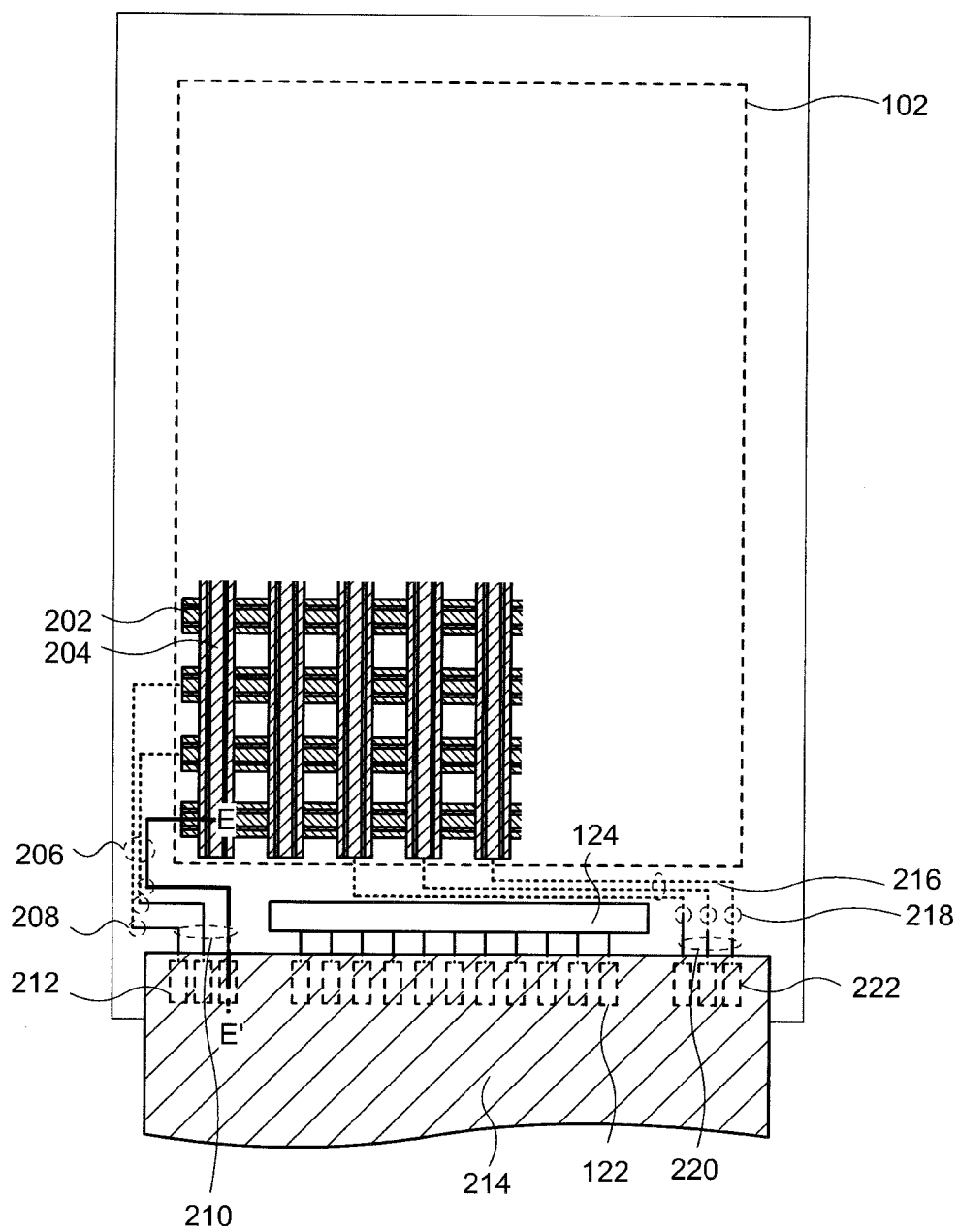
FIG. 1 is a schematic top view of a display device according to a first embodiment of the present invention.
Figure 1:
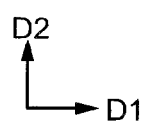

FIG. 1 is a schematic top view of a display device loaded with a touch or proximity sensor (hereinafter simply referred to as a display device) 100 according to a first embodiment of the present invention. The display device 100 includes a display region 102 for displaying a video image. A plurality of first touch electrodes 202 and a plurality of second touch electrodes 204 are overlap the display region 102. The plurality of first touch electrodes 202 extend in a first direction D1 and being arranged in a second direction D2 intersecting the first direction D1. The plurality of second touch electrodes 204 extend in the second direction D2 and being arranged in the first direction D1. Each of the first touch electrodes 202 and each of the second touch electrode 204 are respectively arranged in different layers. The plurality of first touch electrodes 202 and the plurality of second touch electrodes 204 form a touch sensor 200 of a so-called projection capacitance type. The projection capacitance type is roughly classified into a self-capacitance type and a mutual capacitance type. The touch sensor 200 is an example of the touch or proximity sensor in the present disclosure.

In the self-capacitance type, when a detection target such as a person's finger contacts or approaches ("contacts" and "approaches" are hereinafter collectively referred to as "touches") the display region 102 via the first touch electrode 202 and the second touch electrode 204, a capacitance occurring between the detection target and the first touch electrode 202 or the second touch electrode 204 is added to a parasitic capacitance in the first touch electrode 202 or the second touch electrode 204. When a change in the capacitance is read, a position of the touch is detected.

In the mutual capacitance type, the first touch electrode 202 is referred to as a transmission electrode (Tx) and the second touch electrode 204 is referred to as a receiving electrode (Rx), or the second touch electrode 204 is referred to as a transmission electrode (Tx) and the first touch electrode 202 is referred to as a receiving electrode (Rx). When a detection target such as a person's finger touches the display region 102 via the first touch electrode 202 and the second touch electrode 204, a capacitance formed by the first touch electrode 202 and the second touch electrode 204 changes. When the change in the capacitance is read, a position of the touch is detected.

The display device 100 according to the present embodiment is also applicable to both the self-capacitance type and the mutual capacitance type.

The first touch electrode 202 is electrically connected to a first wiring 206 extending from outside the display region 102. The first wiring 206 extends outside the display region 102, and is electrically connected to a first terminal wiring 210 via a contact hole 208. The first terminal wiring 210 is exposed in the vicinity of an end of the display device 100 to form a first terminal 212. The first terminal 212 is connected to a connector 214 such as a flexible printed circuit (FPC) board, and a touch sensor signal is fed to the first touch electrode 202 via the first terminal 212 from an external circuit (not illustrated).

Similarly, the second touch electrode 204 is electrically connected to a second wiring 216 extending from outside the display region 102. The second wiring 216 extends outside the display region 102, and is electrically connected to a second terminal wiring 220 via a contact hole 218. The second terminal wiring 220 is exposed in the vicinity of an end of the display device 100 to form a second terminal 222. The second terminal 222 is connected to the connector 214, and a touch sensor signal is fed to the second touch electrode 204 via the second terminal 222 from the external circuit.

FIG. 1 further illustrates a third terminal 122 for feeding a signal to pixels 120 within the display region 102 and an IC chip 124 for controlling driving of the pixels 120. As illustrated in FIG. 1, the first terminal 212, the second terminal 222, and the third terminal 122 are formed to line up on one side of the display device 100. Thus, in the display device 100, a signal can be fed to the display region 102 and the touch sensor 200 using the single connector 214.

Figure 2:
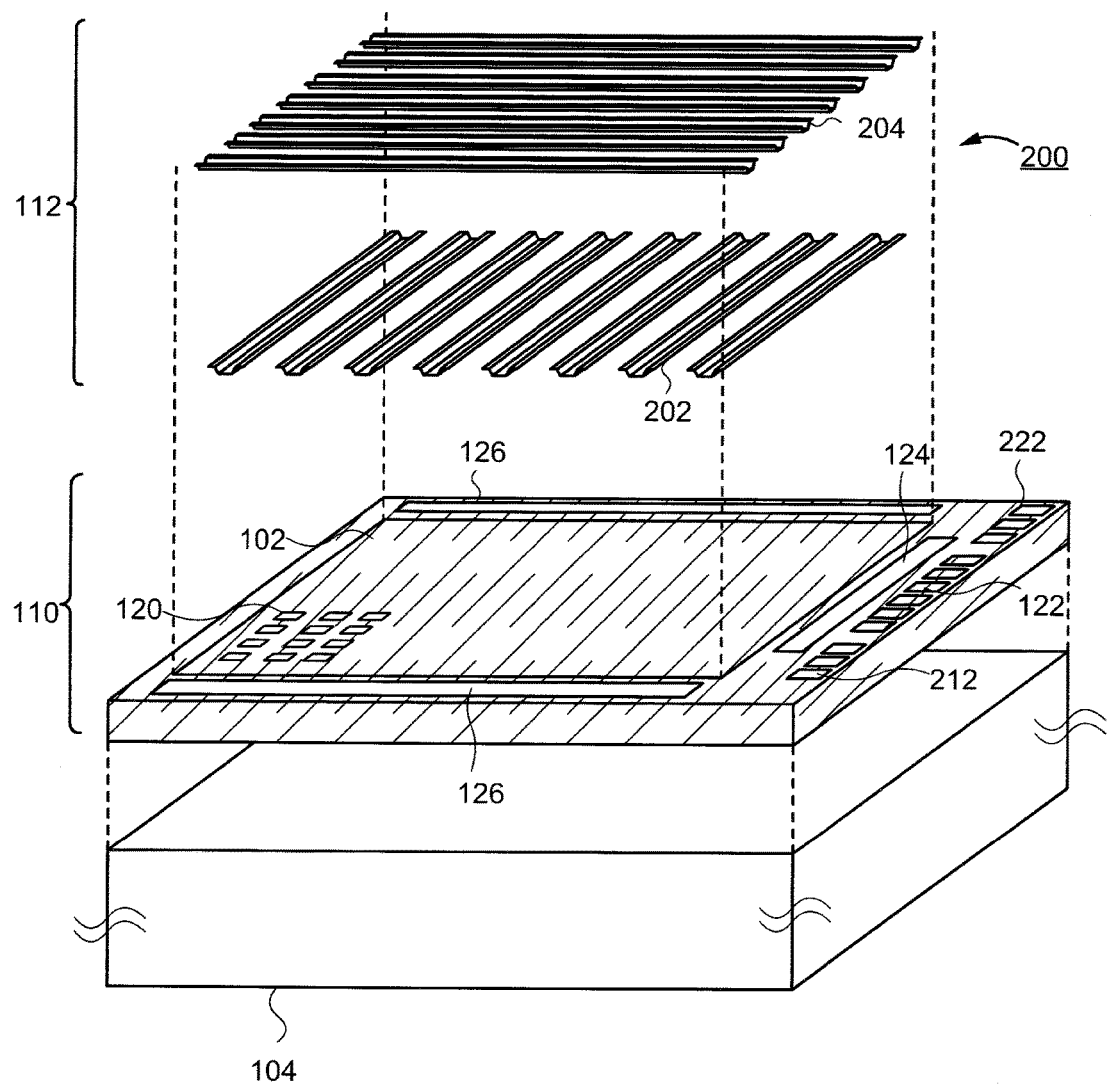
FIG. 2 is a schematic view illustrating a configuration of the display device according to the first embodiment of the present invention.

FIG. 2 is a schematic perspective view of the display device 100. To promote an understanding, a substrate 104, a first layer 110 including the display region 102, and a second layer 112 including the touch sensor 200 are illustrated to separate from one another. A surface, on the side on which the first layer 110 and the second layer 112 are arranged, of the substrate 104 in the touch sensor 200 is written as a "front surface", and a surface on the opposite side thereof is written as a "rear surface".

The first layer 110 is provided on the substrate 104. The first layer 110 includes the above-described display region 102, and the plurality of pixels 120 are provided within the display region 102. A scanning line driving circuit 126 for controlling driving of the pixels 120 is provided outside the display region 102. The scanning line driving circuit 126 need not be directly formed on the substrate 104. Driving circuits formed on a substrate (a semiconductor substrate, etc.) different from the substrate 104 may be provided on the substrate 104 or the connector 214, to control each of the pixels 120. Various types of semiconductor elements for respectively controlling light emitting elements provided within each of the pixels 120 are formed in the first layer 110, which is not herein illustrated.

As described above, the touch sensor 200 is formed of the plurality of first touch electrodes 200 and the plurality of second touch electrodes 204. The touch sensor 200 includes a touch detection region in substantially the same size and shape as those of the display region 102.

[2. Pixel]

Figure 3A:
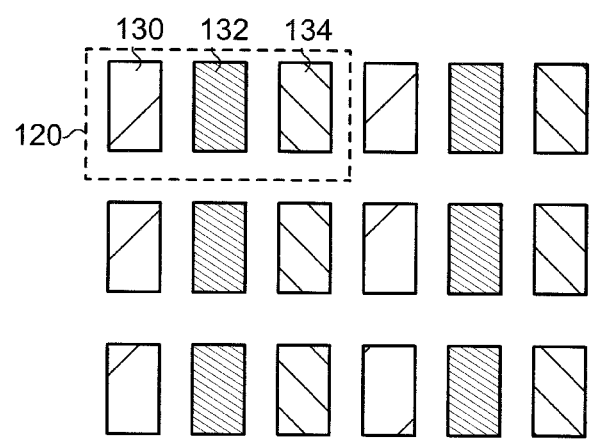
FIG. 3A is a schematic view of pixels in the display device according to the first embodiment of the present invention.

In the present embodiment, the pixel 120 includes a plurality of sub-pixels. The sub-pixels are arranged so that the three sub-pixels 130, 132, and 134 form the one pixel 120, as illustrated in FIG. 3A, for example. Each of the sub-pixels includes one display element such as a light emitting element or a liquid crystal element. A color displayed by the sub-pixel is determined by a characteristic of the light emitting element or a color filter provided on the sub-pixel. In this specification, the pixel 120 is a minimum unit including the sub-pixels, which include respective one display elements and at least one of which displayed s a different color, and constituting a part of a video image reproduced by the display region 102. The sub-pixel within the display region 102 is included in any one of the pixels 120.

In an array illustrated in FIG. 3A, the three sub-pixels 130, 132, and 134 can be configured to respectively display different colors. For example, the sub-pixels 130, 132, and 134 respectively include light emitting elements which emit the three primary colors, i.e., red, green, and blue colors. Thus, each of the pixels 120 can display any color.

Figure 3B:
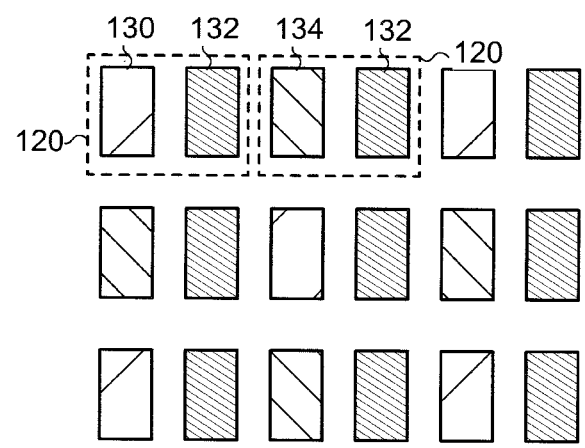
FIG. 3B is a schematic view of the pixels in the display device according to the first embodiment of the present invention.

In an array illustrated in FIG. 3B, two sub-pixels, which differ in color to be displayed, are included in one pixel 120. For example, the one pixel 120 includes the sub-pixels 130 and 132 which respectively display red and green colors. The pixel 120 adjacent to the pixel 120 can include the sub-pixels 134 and 132 which respectively display blue and green colors. In this case, a color area to be reproduced differs between the adjacent pixels 120.

Figure 3C:
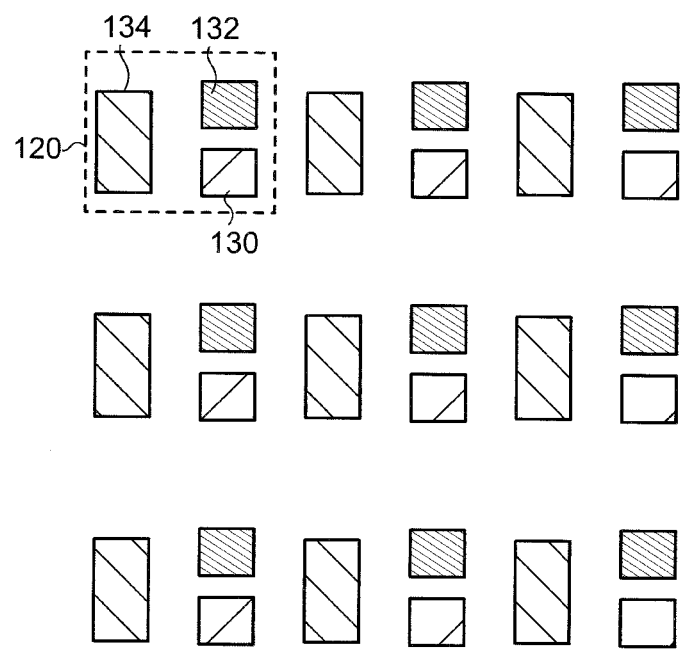
FIG. 3C is a schematic view of the pixels in the display device according to the first embodiment of the present invention.

The respective areas of the sub-pixels within each of the pixels 120 need not be the same. As illustrated in FIG. 3C, for example, one sub-pixel may have an area different from those of other two sub-pixels. In this case, for example, the sub-pixel 134 displaying a blue color may be formed to have the largest area, and the sub-pixels 132 and 130 respectively displaying green and red colors may be formed to have the same area.

[3. Touch Electrode]

Figure 4:
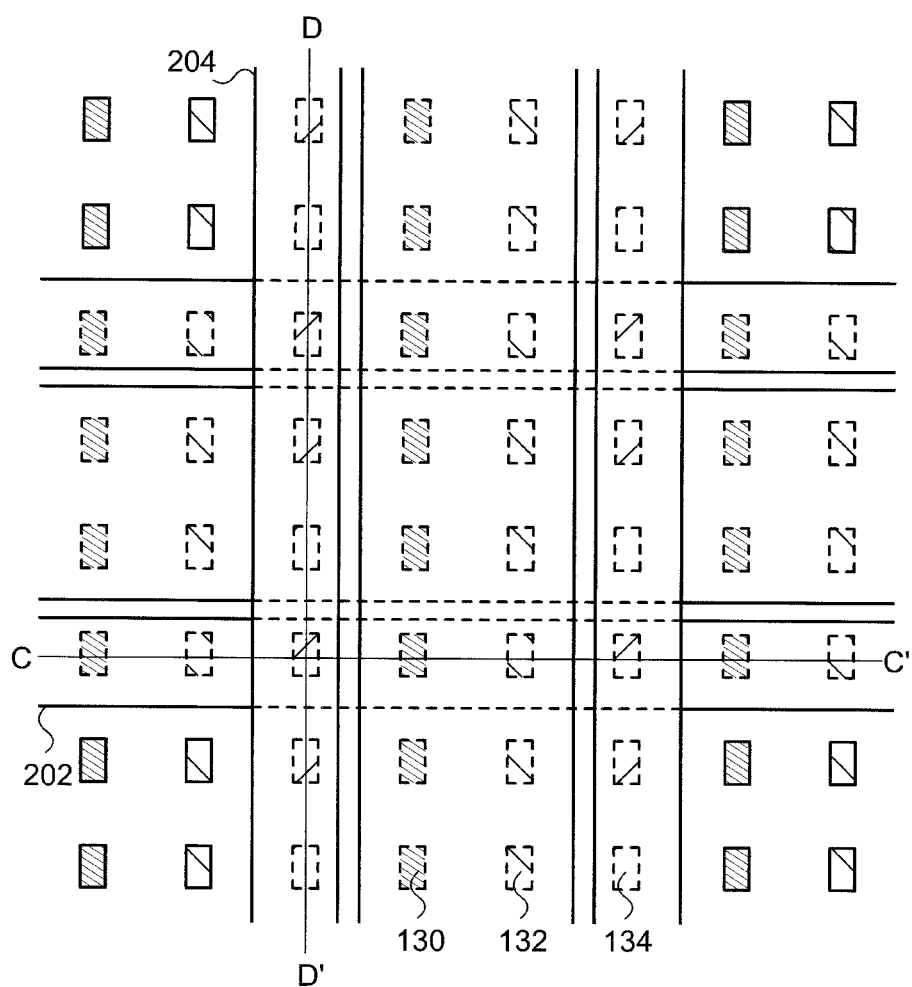
FIG. 4 is a schematic top view of touch electrodes in the display device according to the first embodiment of the present invention.
Figure 5A:
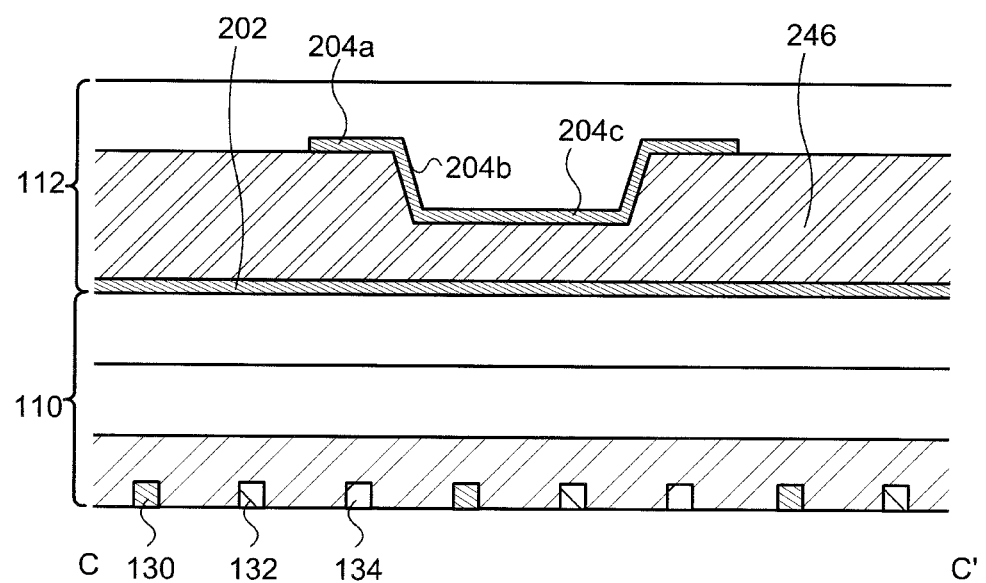
FIG. 5A is a schematic sectional view of the touch electrodes in the display device according to the first embodiment of the present invention.
Figure 5B:
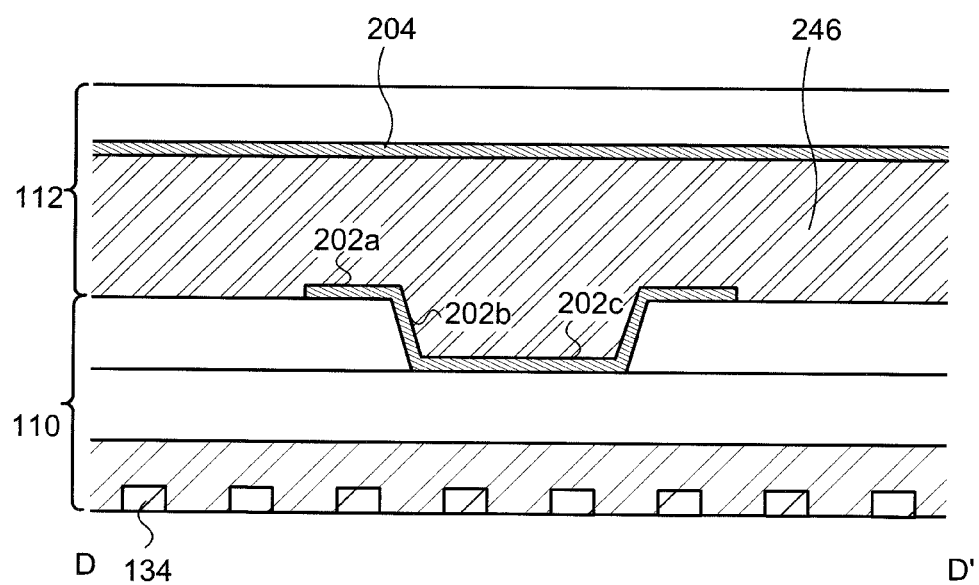
FIG. 5B is a schematic sectional view of the touch electrodes in the display device according to the first embodiment of the present invention.

A mode in which a partial region of FIG. 1 is enlarged is illustrated in FIG. 4, a cross section along a line C-C' illustrated in FIG. 4 is illustrated in FIG. 5A, and a cross section along a line D-D' illustrated in FIG. 4 is illustrated in FIG. 5B. As illustrated in FIG. 4, the first touch electrode 202 and the second touch electrode 204 respectively have strip shapes. The first touch electrode 202 and the second touch electrode 204 intersect each other. The plurality of second touch electrodes 204 are respectively spaced apart from the plurality of first touch electrodes 202 and electrically independent thereof. Thus, the plurality of second touch electrodes 204 are respectively insulated from the plurality of first touch electrodes 202.

The plurality of first touch electrodes 202 respectively extend in the first direction D1 and being arranged in the second direction D2 intersecting the first direction D1. The plurality of second touch electrodes 204 respectively extend in the second direction D2 and being arranged in the first direction D1. Further, in the present embodiment, each of the plurality of first touch electrodes 202 and the plurality of second touch electrodes 204 has a concave surface on a detection surface side (a detection surface side 268A as mentioned below). In the present embodiment, in each of the plurality of first touch electrodes 202 and the plurality of second touch electrodes 204, the concave portion is provided roughly at the center in a width direction, and extends in a direction intersecting the width direction. More specifically, each of the plurality of first touch electrodes 202 includes an upper surface part 202a, a sidewall part 202b, and a bottom surface part 202c. Similarly, each of the plurality of second touch electrodes 204 also includes an upper surface part 204a, a sidewall part 204b, and a bottom surface part 204c. In each of the plurality of first touch electrodes 202 and the plurality of second touch electrodes 204, the upper surface part is not essential. Each of the plurality of first touch electrodes 202 and the plurality of second touch electrodes 204 may have a region which is concave toward the front surface side (convex toward the rear surface side).

Figure 6:
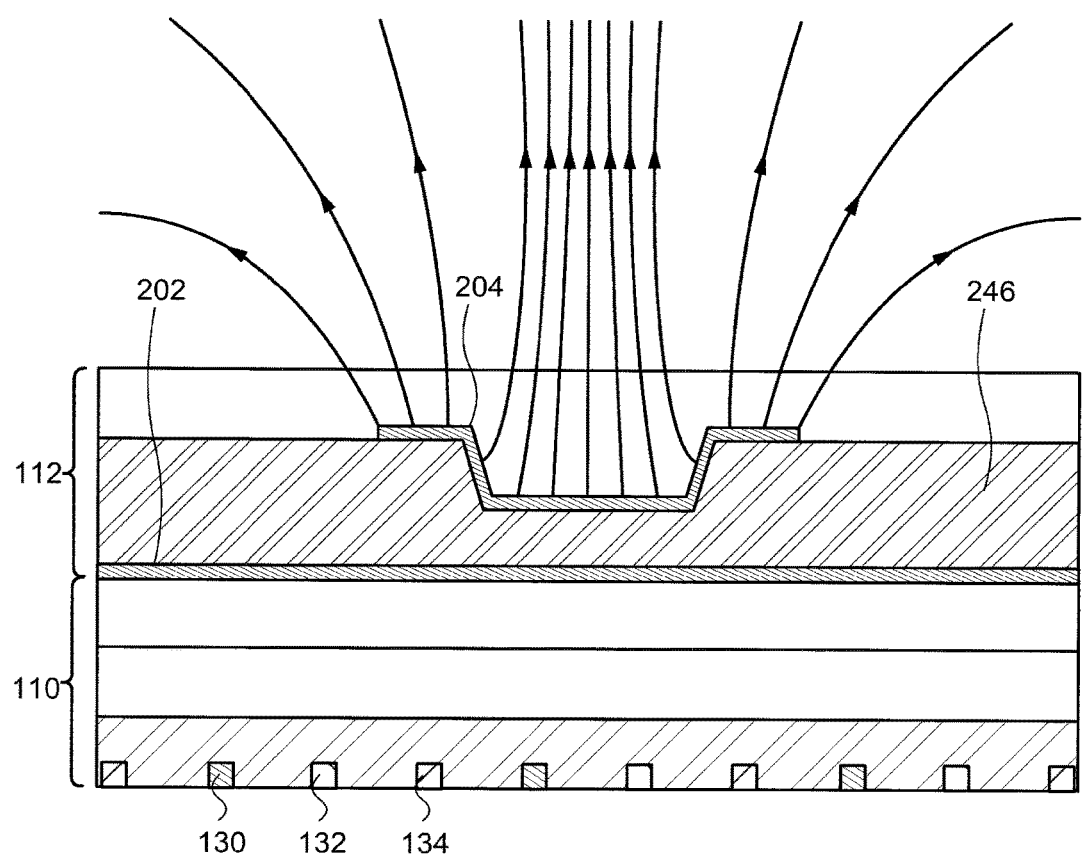
FIG. 6 is a schematic view of electric lines of force emitted by the touch electrode in the display device according to the first embodiment of the present invention.
Figure 7:
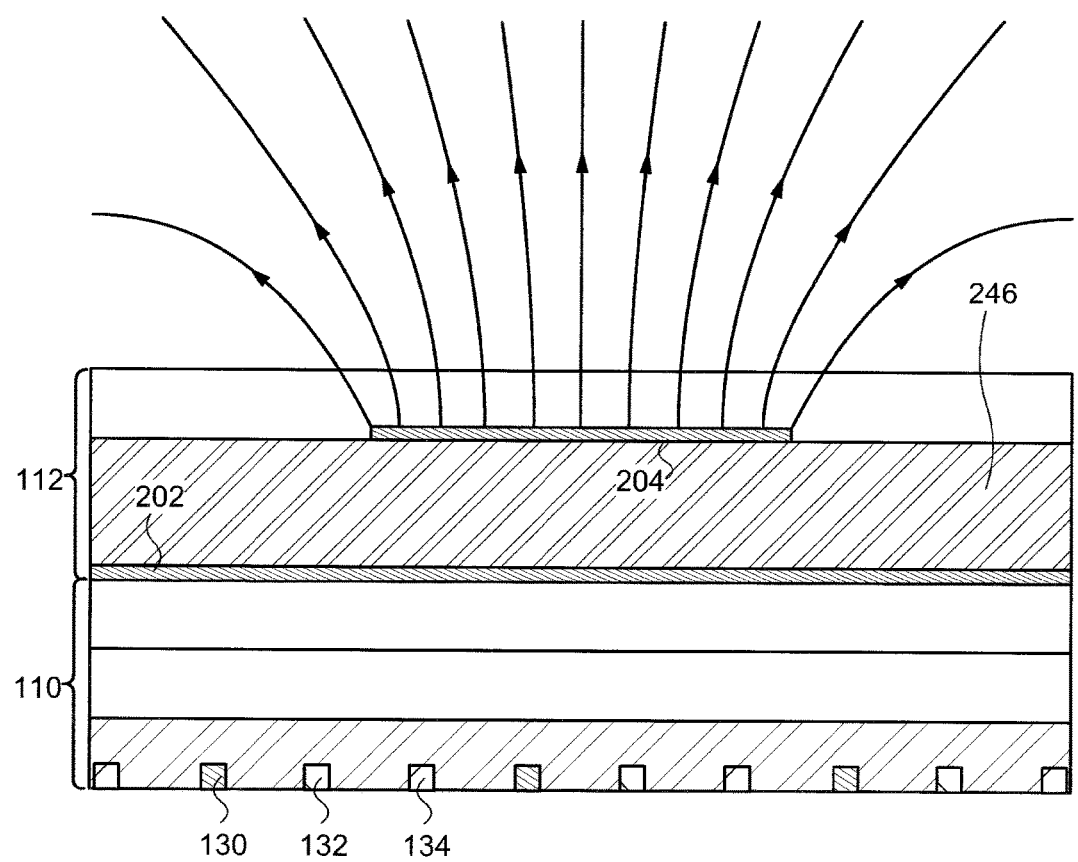
FIG. 7 is a schematic view of electric lines of force emitted by a touch electrode in a conventional display device.

A function and an effect produced by having the above-described configuration of the touch electrodes will be described below with reference to the drawings. FIGS. 6 and 7 respectively illustrate, when a predetermined voltage is applied to the touch electrodes according to the present embodiment and conventional touch electrodes each having no concave portion, electric lines of force emitted by the respective second touch electrodes 204.

Each of the plurality of touch electrodes according to the present embodiment (FIG. 6) has the concave portion so that the surface area thereof more increases than that of each of the conventional touch electrodes having no concave portion (FIG. 7). Thus, the number of electric lines of force emitted (or absorbed) by each of the plurality of touch is larger than that by each of the conventional touch electrodes.

Further, the electric lines of force emitted (or absorbed) by each of the plurality of touch electrodes according to the present embodiment are directed toward the inside of the concave portion, and are then directed upward. That is, the electric lines of force are collected toward the center of the concave portion of the touch electrode, and thus are inhibited from being diffused toward a front surface of the touch panel. Thus, the number of electric fields not only on the front surface of the touch panel but also at a position spaced apart from the front surface of the touch panel increases. Accordingly, a capacitance betweens the touch panel and not only a detection target contacting the front surface of the touch panel but also a detection target spaced apart from the front surface of the touch panel can be increased. Thus, a detection sensitivity of the detection target spaced apart from the front surface of the touch panel is improved. Among respective capacitances formed between the detection target and the plurality of touch electrodes, a contrast between the capacitance relating to the touch electrode closest to the detection target and the capacitance relating to the touch electrode spaced apart from the detection target increases. Thus, a detection accuracy of coordinates of the detection target projected onto the front surface of the touch panel is improved.

From the above, the detection sensitivity of the detection target not contacting the front surface of the touch panel and the detection accuracy of the coordinates of the detection target projected onto the front surface of the touch panel can be improved.

Figure 8A:
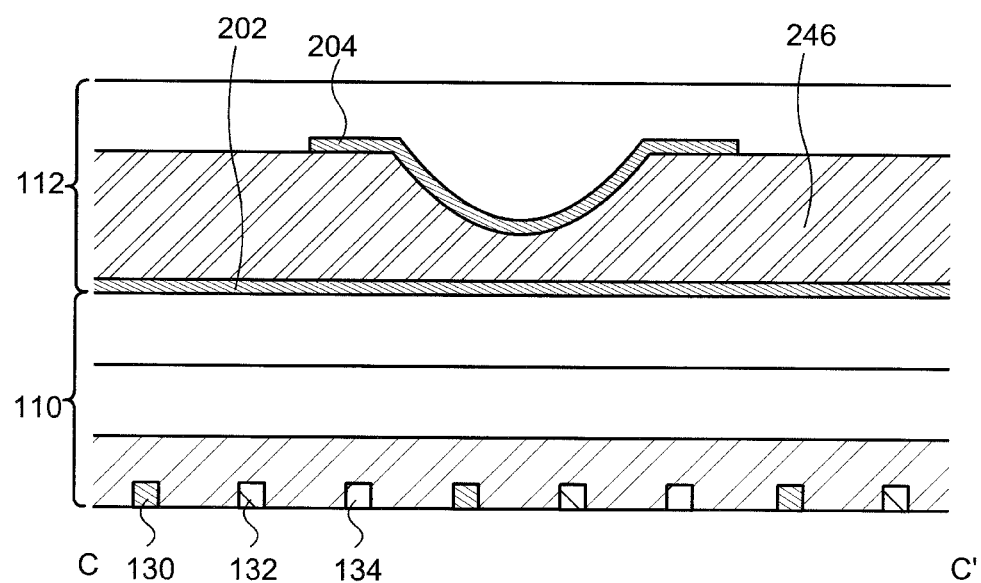
FIG. 8A is a schematic sectional view of the touch electrodes in the display device according to the first embodiment of the present invention.
Figure 8B:
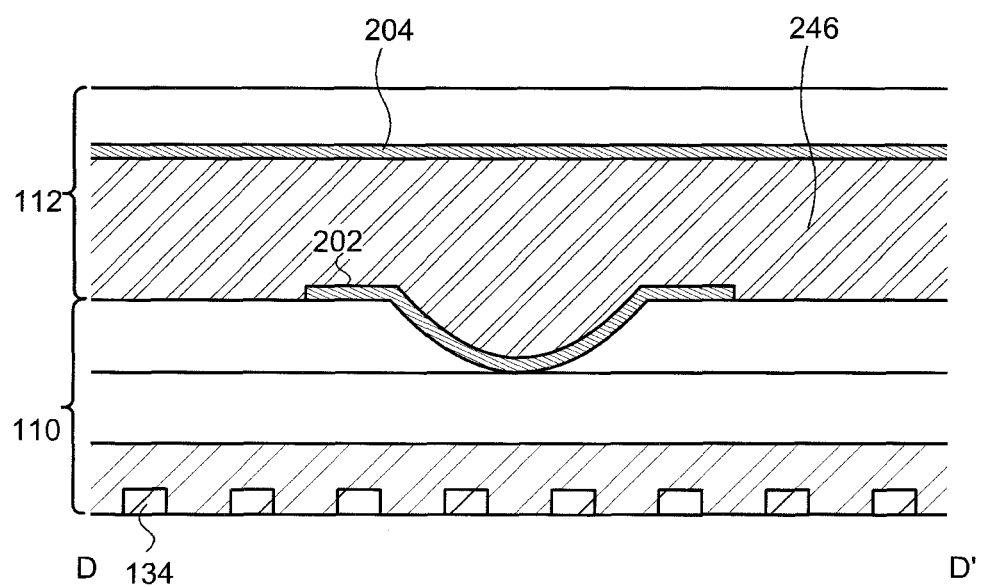
FIG. 8B is a schematic sectional view of the touch electrodes in the display device according to the first embodiment of the present invention.

A cross-sectional shape of the touch electrodes each having the concave portion is not limited to the cross-sectional shape in the present embodiment. FIG. 8A illustrates another example of the cross section taken along the line C-C' illustrated in FIG. 4, and FIG. 8B illustrates another example of the cross section taken along the line D-D' illustrated in FIG. 4. In this example, the concave portion has a parabolic cross-sectional shape in a cross section in the width direction of the touch electrode. Such a configuration enables a stronger electric field to be formed at a position spaced apart from the touch electrode. Thus, the detection sensitivity of the detection target spaced apart from the front surface of the touch panel is improved. Further, such a configuration further inhibits electric lines of force emitted (or absorbed) by each of the touch electrodes from being dispersed in a direction parallel to the front surface of the touch panel. Thus, the detection accuracy of the coordinates of the detection target projected onto the front surface of the touch panel is further improved.

As another example, the number of concave portions provided in each of the plurality of touch electrodes may be one or more. Such a configuration enables the surface area of the touch electrode to be made larger and enables a stronger electric field to be formed at a position spaced apart from the touch electrode. Thus, the detection sensitivity of the detection target spaced apart from the front surface of the touch panel is further improved.

The first touch electrodes 202 and the second touch electrode 204 respectively exist within different layers, as illustrated in FIGS. 5A and 5B which are schematic cross-sectional views along the lines C-C' and D-D' in FIG. 4. In this case, an interlayer insulating film 246 is arranged between the first touch electrode 202 and the second touch electrode 204. The interlayer insulating film 246 has concave portions arranged in a striped shape. When the second touch electrode 204 is formed to cover the concave portion, a concave portion is formed on a front surface of the second touch electrode 204.

The first touch electrode 202 and the second touch electrode 204 contain an oxide, which can transmit visible light, because they are provided to overlap the display region 102, as also illustrated in FIG. 2. Examples of the oxide include an indium tin oxide (ITO) and an indium zinc oxide (IZO). However, if each of the first touch electrode 202 and the second touch electrode 204 is formed to overlap only gap portions among the pixels 120, the first touch electrode 202 and the second touch electrode 204 may be formed of an opaque metal material or the like.

[4. Cross-sectional Structure]

Figure 9:
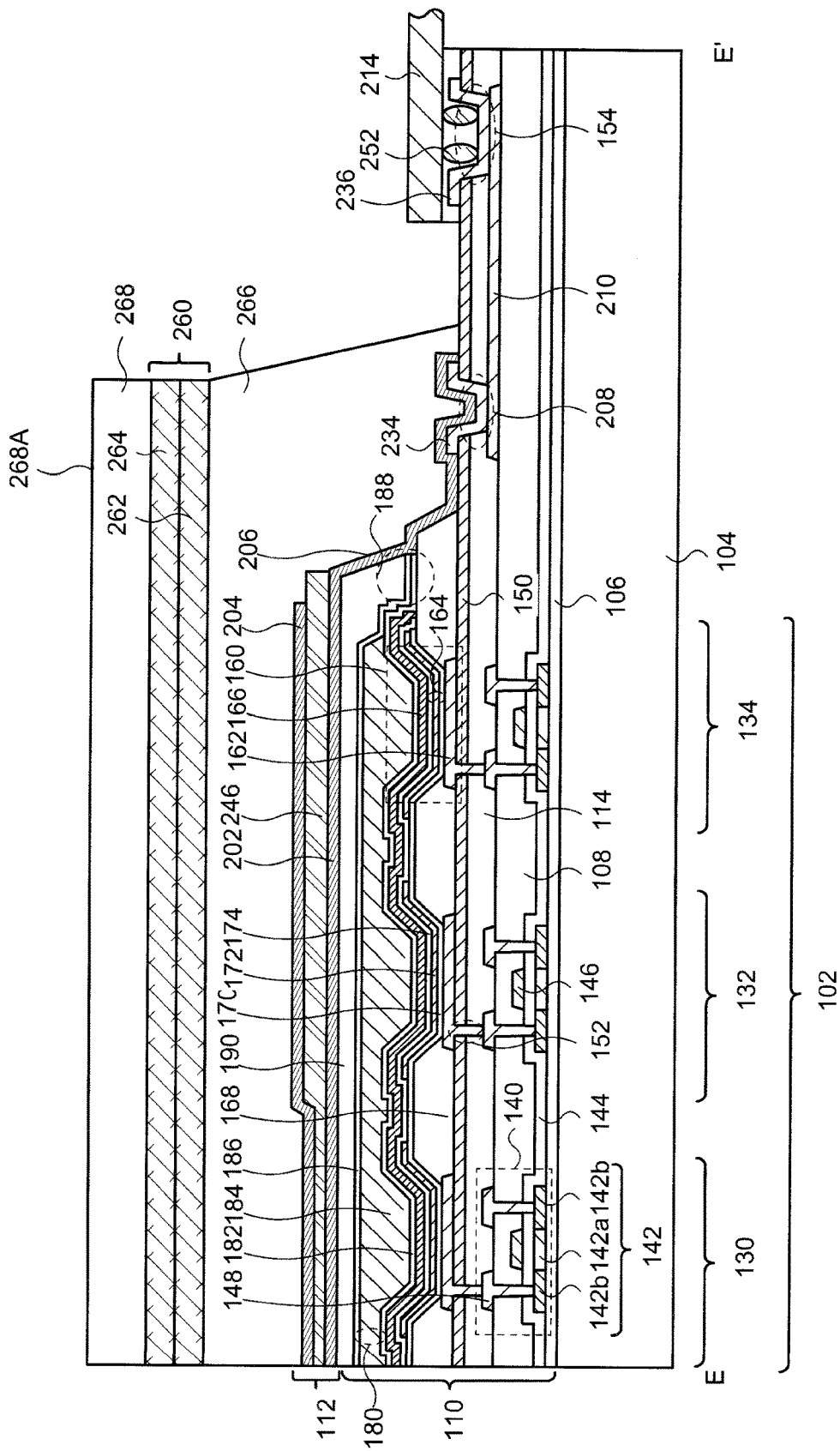
FIG. 9 is a schematic sectional view of the display device according to the first embodiment of the present invention.

FIG. 9 is a schematic sectional view of the display device 100. FIG. 9 schematically illustrates a cross section along a chain line E-E' in FIG. 1 and leading to the first wiring 206, the first terminal wiring 210, and the first terminal 212 from the display region 102.

The display device 100 includes the first layer 110 on the substrate 104 and the second layer 112 on the first layer 110. If the substrate 104 has flexibility, the substrate 104 may be referred to as a base material, a base film, or a sheet base material. The first layer 110 is provided with a transistor and a light emitting element for controlling each of the sub-pixels 130, 132, and 134, to contribute to reproduction of a video image, as described below. On the other hand, the touch sensor 200 is provided in the second layer 112, to contribute to touch detection.

<1. First Layer>

A transistor 140 is provided on the substrate 104 with a base film 106 having any configuration interposed therebetween. The transistor 140 includes a semiconductor film 142, a gate insulating film 144, a gate electrode 146, a source/drain electrode 148, and the like. The gate electrode 146 overlaps the semiconductor film 142 with the gate insulating film 144 interposed therebetween. A region overlapping the gate electrode 146 is a channel region 142a in the semiconductor film 142. The semiconductor film 142 may include a source/drain region 142b so that the channel region 142a is sandwiched therebetween. An interlayer film 108 is provided on the gate electrode 146. The source/drain electrode 148 is connected to the source/drain region 142b in an opening provided in the interlayer film 108 and the gate insulating film 144.

The first terminal wiring 210 is provided on the interlayer film 108. As illustrated in FIGS. 8A and 8B, the first terminal wiring 210 can exist within the same layer as that in which the source/drain electrode 148 exists. The first terminal wiring 210 may be configured to exist within the same layer as that in which the gate electrode 146 exists, which is not illustrated.

While the transistor 140 is illustrated as a top gate transistor in FIG. 9, a structure of the transistor 140 is not limited. The transistor 140 may be a bottom gate transistor, a multigate transistor including a plurality of gate electrodes 146, or a dual gate transistor having a structure in which the top and bottom of the semiconductor film 142 are sandwiched between the two gate electrodes 146. While an example in which the one transistor 140 is provided in each of the sub-pixels 130, 132, and 134 is illustrated in FIGS. 8A and 8B, each of the sub-pixels 130, 132, and 134 may further include a plurality of semiconductor elements such as transistors 140 or capacitive elements.

A flattening film 114 is provided on the transistor 140. The flattening film 114 has a function of suppressing an influence of unevenness caused by the transistor 140 or the other semiconductor element to have a flat surface.

An inorganic insulating film 150 may be formed on the flattening film 114. The inorganic insulating film 150 has a function of protecting the semiconductor element such as the transistor 140. A capacitance is formed between a first electrode 162 in a light emitting element 160, described below, and an electrode (not illustrated) formed in a layer below the inorganic insulating film 150 with the inorganic insulating film 150 sandwiched between the first electrode 162 and itself.

A plurality of openings are provided in the flattering film 114 and the inorganic insulating film 150. One of the plurality of openings is a contact hole 152. The contact hole 152 is used for electrical connection between the first electrode 162 in the light emitting element 160, described below, and the source/drain electrode 148. One of the other openings is a contact hole 208. The contact hole 208 is used for electrical connection between the first wiring 206 and the first terminal wiring 210. One of the other openings is an opening 154. The opening 154 is provided to expose a part of the first terminal wiring 210. The first terminal wiring 210 exposed in the opening 154 is connected to a connector 214 by an anisotropic conductive film 252, for example.

The light emitting element 160 is formed on the flattening film 114 and the inorganic insulating film 150. The light emitting element 160 includes a first electrode (pixel electrode) 162, a functional layer 164, and a second electrode (opposite electrode) 166. More specifically, the first electrode 162 covers the contact hole 152 and be electrically connected to the source/drain electrode 148. Thus, a current is supplied to the light emitting element 160 via the transistor 140. A partition wall 168 is provided to cover an end of the first electrode 162. The partition wall 168 can prevent the functional layer 164 and the second electrode 166 provided thereon from being disconnected by covering the end of the first electrode 162. The functional layer 164 covers the first electrode 162 and the partition wall 168. The second electrode 166 is formed on the functional layer 164. Carriers are injected into the functional layer 164 from the first electrode 162 and the second electrode 166 so that the carriers are recombined within the functional layer 164. Thus, luminescent molecules within the functional layer 164 enter an excited state so that light emission is obtained via a process in which the luminescent molecules are relaxed to a ground state. Therefore, a region where the first electrode 162 and the functional layer 164 contact each other becomes a luminous region in each of the sub-pixels 130, 132, and 134.

A configuration of the functional layer 164 can be selected, as needed. For example, the functional layer 164 can be configured by combining a carrier injection layer, a carrier transport layer, a light emitting layer, a carrier inhibition layer, an exciter inhibition layer, and the like. FIG. 9 illustrates an example in which the functional layer 164 includes three layers 170, 172, and 174. In this example, the layer 170 is a carrier (hole) injection/transport layer, the layer 172 is a light emitting layer, and the layer 174 is a carrier (electron) injection/transport layer. The layer 172 serving as the light emitting layer is configured to respectively contain different materials in the sub-pixels 130, 132, and 134, as illustrated in FIG. 9. In this case, the other layers 170 and 174 may be formed over the sub-pixels 130, 132, and 134 and the partition wall 168 to be shared among the sub-pixels 130, 132, and 134. When a material used in the layer 172 is selected, as needed, different luminescent colors can be respectively displayed in the sub-pixels 130, 132, and 134. Alternatively, a structure of the layer 174 may be made identical among the sub-pixels 130, 132, and 134. In this case, the layer 174 may also be formed over the sub-pixels 130, 132, and 134 and the partition wall 168 to be shared among the sub-pixels 130, 132, and 134. In such a configuration, an identical luminescent color is outputted from the respective layers 172 in the sub-pixels 130, 132, and 134. Therefore, the layer 172 may be configured to be able to emit white light, for example, and various colors (e.g., red, green, and blue colors) may be respectively extracted from the sub-pixels 130, 132, and 134 using the color filters.

The display device 100 may further include connection electrodes 234 and 236 covering the contact hole 208 and an opening 154 and contacting the first terminal wiring 210. The connection electrodes 234 and 236 may exist within the same layer as that in which the first electrode 162 exists. When the connection electrodes 234 and 236 are formed, a damage to the first terminal wiring 210 in processes for manufacturing the display device 100 can be reduced so that electrical connection low in contact resistance can be implemented.

A sealing film (passivation film) 180 is on the light emitting element 160. The sealing film 180 can prevent impurities (water, oxygen, etc.) from entering the light emitting element 160 and the transistor 140 from outside. The sealing film 180 includes three layers 182, 184, and 186, as illustrated in FIG. 9. An inorganic film containing an inorganic compound can be used for the layer (first inorganic film) 182 and the layer (second inorganic film) 186. On the other hand, a film (organic film) 184 containing an organic compound can be used as the layer 184 between the first inorganic film 182 and the second inorganic film 186. The organic film 184 has a flat surface by suppressing an influence of unevenness caused by the light emitting element 160 and the partition wall 168. Therefore, the thickness of the organic film 184 is relatively large. As a result, a distance between the first touch electrode 202 in the touch sensor 200 and the one electrode (second electrode 166) in the light emitting element 160, described below, can be increased. As a result, a parasitic capacitance occurring between the touch sensor 200 and the second electrode 166 is significantly decreased.

The first inorganic film 182 and the second inorganic film 186 are preferably formed to remain within the display region 102. In other words, the first inorganic film 182 and the second inorganic film 186 are provided not to overlap the contact hole 208 and the opening 154. Thus, electrical connection low in contact resistance can be made between the first terminal wiring 210 and the connector 214 or between the first terminal wiring 210 and the first wiring 206. Further, the first inorganic film 182 and the second inorganic film 186 preferably directly contact each other around the display region 102 (see a region enclosed by a circle 188 in FIG. 9). Thus, the organic film 184 having a higher hydrophilic property than those of the first inorganic film 182 and the second inorganic film 186 can be sealed by the first inorganic film 182 and the second inorganic film 186. Therefore, entrance of impurities from outside and diffusion of impurities inside the display region 102 can be more effectively prevented.

The display device 100 further includes an organic insulating film 190 on the sealing film 180. The organic insulating film 190 contacts the second inorganic film 186 in the sealing film 180.

The first layer 110 is configured by the above-described various elements and films.

<2. Second Layer>

The second layer 112 includes the first touch electrode 202, the second touch electrode 204, the interlayer insulating film 246, the first wiring 206, and the second wiring 216.

The first touch electrode 202 is a strip-shaped wiring having a concave portion formed on its surface. The wiring is formed on the sealing film 180 and the organic insulating film 190. The first touch electrode 202 and the organic insulating film 190 may directly contact each other.

The first touch electrode 202 exist within the same layer as that in which the first wiring 206 exists. The first wiring 206 have a similar structure to that of the first touch electrode 202. And The first wiring 206 is formed using a similar method to that for forming the first touch electrode 202. The first wiring 206 extends to the contact hole 208 via a portion outside the display region 102 (see FIG. 1). The first wiring 206 is further electrically connected to the first terminal wiring 210 existing in the same layer as that in which the source/drain electrode 148 (or the gate electrode 146) in the transistor 140 exists via the connection electrode 234 in the contact hole 208. Thus, the first touch electrode 202 and the first terminal wiring 210 are electrically connected to each other.

On the plurality of first touch electrodes 202, the interlayer insulating film 246 is provided to cover the plurality of first touch electrodes 202. The interlayer insulating film 246 is provided with a concave portion. On the front surface of the second touch electrode 204 provided on the interlayer insulating film 246, a concave portion is formed according to the concave portion on the interlayer insulating film 246.

The second touch electrode 204 is also a strip-shaped wiring having a concave portion formed on its surface. The wiring is formed on the interlayer insulating film 246. The second touch electrode 204 and the interlayer insulating film 246 may directly contact each other.

The second touch electrode 204 exists within the same layer as that in which the second wiring 216 exists. The second wiring 216 have a similar structure to that of the second touch electrode 204, and be formed using a similar method to that for forming the second touch electrode 204.

The second touch electrode 204 is electrically connected to the second wiring 216 extending from outside the display region 102. The second wiring 216 extends outside the display region 102, and is electrically connected to the second terminal wiring 220 in the contact hole 218. The second terminal wiring 220 is exposed in the vicinity of the end of the display device 100 to form the second terminal 222. The second terminal 222 is connected to the connector 214, and a touch sensor signal is fed to the second touch electrode 204 via the second terminal 222 from the external circuit.

<3. Another Structure>

The display device 100 further includes a circularly polarizing plate 260 overlapping the display region 102 as any configuration. The circularly polarizing plate 260 have a stacked structure of a ¼λ plate 262 and a linearly polarizing plate 264 arranged thereon, for example. Light incident from outside the display device 100 becomes linear polarized light after being transmitted by the linearly polarizing plate 264, and then becomes right-handed circular polarized light when transmitted by the ¼λ plate 262. The circular polarized light becomes left-handed circular polarized light when reflected by the first electrode 162, the first touch electrode 202, or the second touch electrode 204. The circular polarized light becomes linear polarized light by being transmitted by the ¼λ plate 262 again. A polarization plane of the linear polarized light is perpendicular to linear polarized light before the reflection. Therefore, the linear polarized light does not be transmitted by the linearly polarizing plate 264. As a result, when the circularly polarizing plate 260 is installed, external light is inhibited from being reflected so that a video image high in contrast can be provided.

An insulating film 266 may be provided as a protective film in a layer above the plurality of first touch electrodes 202 and the plurality of second touch electrodes 204. A refractive index of the insulating film 266 is preferably substantially equal to a refractive index of the interlayer insulating film 246. For this purpose, a similar material may be used as the insulating film 266 and the interlayer insulating film 246. Thus, an optical path difference between emitted light from the sub-pixel arranged in a region overlapping the concave portion of the interlayer insulating film 246 and emitted light from the sub-pixel arranged in a region not overlapping the concave portion of the interlayer insulating film 246 can be kept small so that the concave portion of the touch electrode becomes difficult to visually recognize. That is, the concave portion of the touch electrode becomes inconspicuous. Thus, visibility caused by the concave portion of the touch electrode can be inhibited from deteriorating.

Even when a material having a refractive index, which differs between the insulating film 266 and the interlayer insulating film 246, is used, the above-described optical path difference may be adjusted to be kept small by adjusting the respective film thicknesses in a region, overlapping the concave portion, of the insulating film 266 and the other region.

Further, the insulating film 266 has a function of physically protecting the display device 100 and making the circularly polarizing plate 260 and the second layer 112 adhere to each other.

Further, the display device 100 may be provided with a cover film 268 as any configuration. The cover film 268 has a function of physically protecting the circularly polarizing plate 260. One surface of the cover film 268 is a detection surface 268A. The detection surface 268A is a surface touched by person's finger. The plurality of first touch electrodes 202 and the plurality of second touch electrodes 204 respectively have concave surface on the detection surface 268A side. The detection surface 268A is also a display surface of the display device 100.

[5. Layout of Touch Electrode and Pixels]

As described above, each of the first touch electrode 202 and the second touch electrode 204 in the present embodiment is a strip-shaped wiring having a concave portion on its surface. Further, in each of the plurality of first touch electrodes 202 and the plurality of second touch electrodes 204, the concave portion is provided roughly at the center in the width direction, and extends in the direction intersecting the width direction. Therefore, each of the plurality of touch electrodes includes a top surface part, a sidewall part, and a bottom surface part (FIGS. 5A and 5B). As illustrated in FIG. 4 and FIGS. 5A and 5B, the sidewall part is formed between the adjacent sub-pixels, i.e., along the partition wall 168.

The display device 100 can be provided with the circularly polarizing plate 260. Therefore, external light reflected by the first touch electrode 202 and the second touch electrode 204 is not emitted out of the display device 100 so that a high-contrast and high-quality video image can be provided.

(Second Embodiment)

In the present embodiment, the method for manufacturing the display device 100 described in the first embodiment will be described with reference to FIG. 9 and FIGS. 10A to 15. FIGS. 10A to 15 correspond to a cross section illustrated in FIG. 9. Description of the same content as the content described in the first embodiment may be omitted.

[1. First Layer]

Figure 10A:
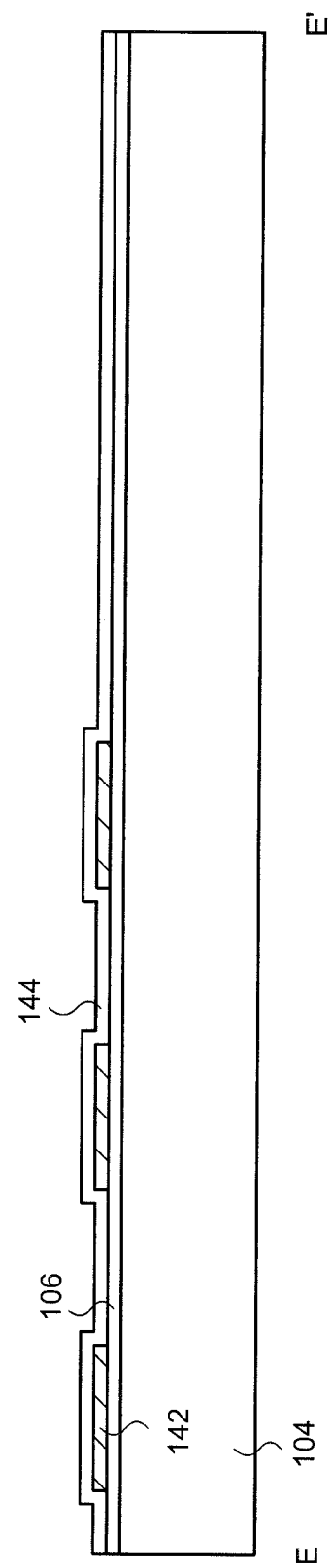
FIG. 10A is a schematic sectional view illustrating a method for manufacturing a display device according to a second embodiment of the present invention.

As illustrated in FIG. 10A, a base film 106 is first formed on a substrate 104. The substrate 104 supports a semiconductor element, included in a display region 102, such as a transistor 140, a touch sensor 200, and the like. Therefore, a material having heat resistance to respective process temperatures for various types of elements formed thereon and chemical stability to chemicals used in processes may be used for the substrate 104. More specifically, the substrate 104 may contain glass, quartz, plastic, a metal, ceramic, and the like.

If the display device 100 has the flexibility, a base material may be formed on the substrate 104. In this case, the substrate 104 is also referred to as a support substrate. The base material is an insulating film having flexibility, and may contain a material selected from high-polymer materials including, for example, polyimide, polyamide, polyester, and polycarbonate. The base material may be formed by applying a wet film formation method such as a printing method, an ink jet method, a spin coating method, or a dip coating method or a lamination method, for example. In this case, when the substrate 104 is stripped from an interface of the substrate 104 and the base material after the display device 100 is manufactured, the display device 100 can have flexibility. On the other hand, the display device 100 may be manufactured by making the substrate 104 itself of the above-described material having flexibility.

The base film 106 is a film preventing impurities such as an alkali metal from being diffused to the transistor 140 or the like from the substrate 104 (and the base material). The base film 106 may contain an inorganic insulator such as a silicon nitride, a silicon oxide, a silicon nitroxide, or a silicon oxynitride. The base film 106 may be formed to have a single layer structure or a stacked structure by applying a chemical vapor deposition method (CVD method), a sputtering method, or the like. If an impurity concentration in the base film 106 is low, the base film 106 need not be provided, or may be formed to cover only a part of the substrate 104.

A semiconductor film 142 is then formed (FIG. 10A). The semiconductor film 142 may contain a group 14 element such as silicon. Alternatively, the semiconductor film 142 may contain an oxide semiconductor. The oxide semiconductor may contain a group 13 element such as indium or gallium. Examples of the oxide semiconductor can include a mixed oxide of indium and gallium (IGO). If the oxide semiconductor is used, the semiconductor film 142 may further contain a group 12 element. Examples of the oxide semiconductor can include a mixed oxide of indium, gallium, and zinc (IGZO). Crystallizability of the semiconductor film 142 is not limited, and the semiconductor film 142 may have a crystalline state of any one of a single crystal, a multicrystal, a microcrystal, and amorphous.

If the semiconductor film 142 contains silicon, the semiconductor film 142 may be formed by a CVD method using silane gas or the like as a raw material. Obtained amorphous silicon may be crystallized by heating processing or irradiating light such as a laser. If the semiconductor film 142 contains an oxide semiconductor, the semiconductor film 14 can be formed using a sputtering method or the like.

A gate insulating film 144 is then formed to cover the semiconductor film 142 (FIG. 10A). The gate insulating film 144 may have both a single layer structure and a stacked structure, and can be formed using a similar method to that for forming the base film 106.

Figure 10B:
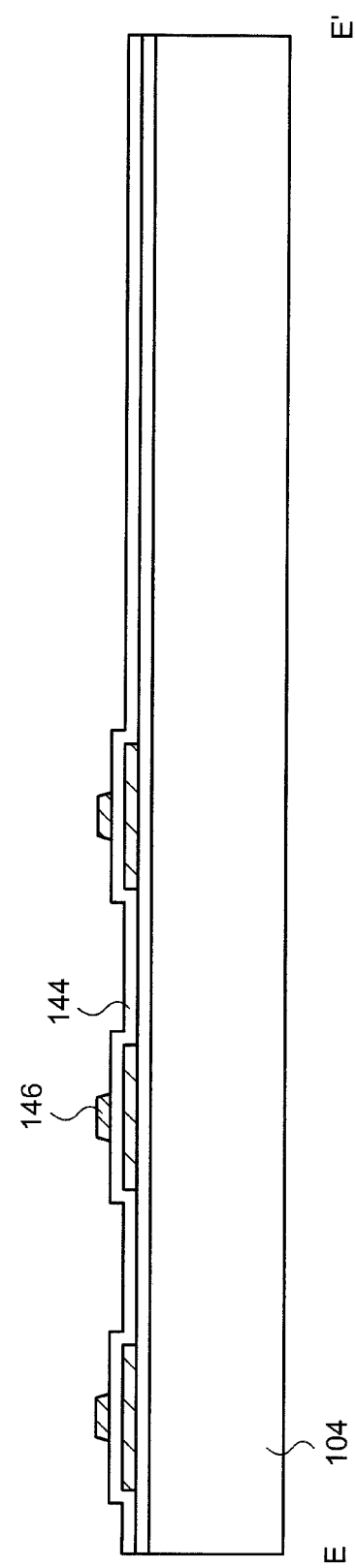
FIG. 10B is a schematic sectional view illustrating the method for manufacturing the display device according to the second embodiment of the present invention.

Then, a gate electrode 146 is formed on the gate insulating film 144 using a sputtering method or a CVD method (FIG. 10B). The gate electrode 146 can be formed to have a single layer structure or a stacked structure by using metals such as titanium, aluminum, copper, molybdenum, tungsten, and tantalum and their alloys. A structure in which a metal having a high conductive property such as aluminum or copper is sandwiched between the metals each having a relatively high melting point such as titanium, tungsten, and molybdenum can be adopted.

Figure 11A:
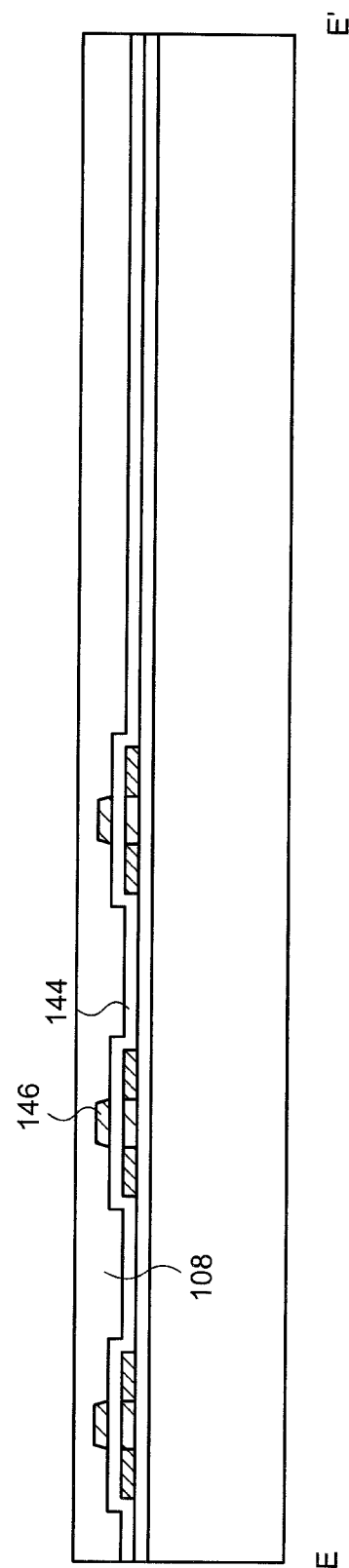
FIG. 11A is a schematic sectional view illustrating the method for manufacturing the display device according to the second embodiment of the present invention.

An interlayer film 108 is then formed on the gate electrode 146 (FIG. 11A). The interlayer film 108 may have both a single layer structure and a stacked structure, and can be formed using a similar method to that for forming the base film 106. When the interlayer film 108 has a stacked structure, a layer containing an inorganic compound may be stacked after a layer containing an organic compound is formed, for example.

The interlayer film 108 and the gate insulating film 144 are then etched, to form an opening reaching the semiconductor film 142. The opening can be formed by performing plasma etching in gas containing a fluorine-containing carbon hydride, for example.

A metal film is then formed to cover the opening, and is etched and molded to form a source/drain electrode 148. In the present embodiment, a first terminal wiring 210 is formed at the same time that the source/drain electrode 148 is formed (FIG. 11B). Therefore, the source/drain electrode 148 and the first terminal wiring 210 can exist within the same layer. The metal film can have a similar structure to that of the gate electrode 146, and can be formed using a similar method to that for forming the gate electrode 146.

Figure 12A:
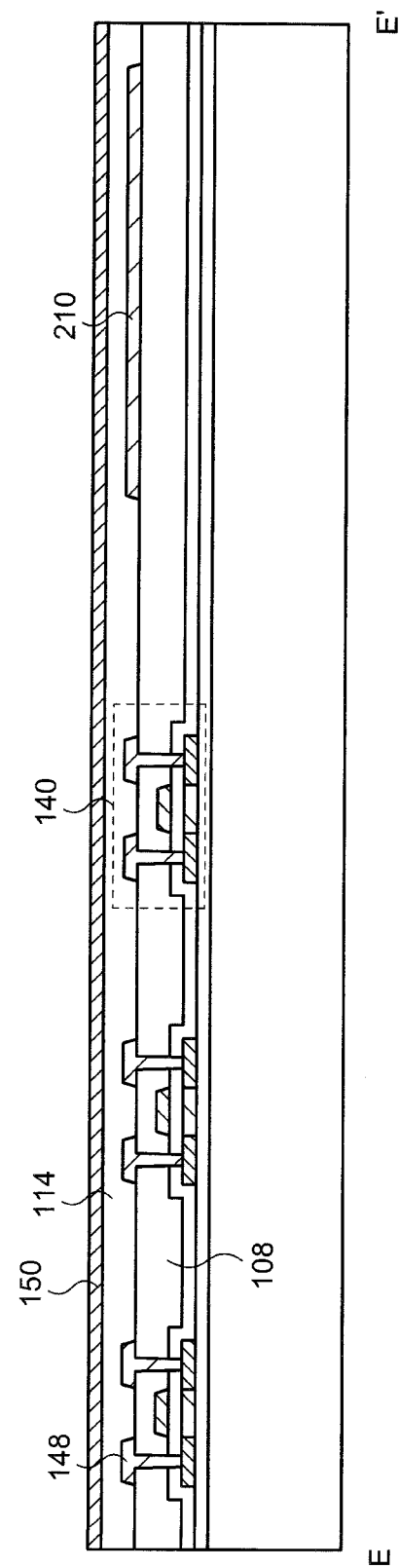
FIG. 12A is a schematic sectional view illustrating the method for manufacturing the display device according to the second embodiment of the present invention.

A flattening film 114 is then formed to cover the source/drain electrode 148 and the first terminal wiring 210 (FIG. 12A). The flattening film 114 has a function of suppressing influences of unevenness and inclination caused by the transistor 140 and the first terminal wiring 210 to form a flat surface. The flattening film 114 may be formed of an organic insulator. Examples of the organic insulator include high-polymer materials such as epoxy resin, acrylic resin, polyimide, polyamide, polyester, polycarbonate, and polysiloxane. The flattening film 114 may be formed by the above-described wet film formation method.

Then, an inorganic insulating film 150 is formed on the flattening film 114 (FIG. 12A). As described above, the inorganic insulating film 150 not only functions as a protective film for the transistor 140. But also, the inorganic insulating film 150, together with a first electrode 162 in a light emitting element 160 formed later, forms a capacitance (not illustrated). Therefore, the inorganic insulating film 150 is preferably used by a material having a relatively high dielectric constant. The first electrode 162 can be formed by applying a CVD method or a sputtering method using a silicon nitride, a silicon nitroxide, or a silicon oxynitride, for example.

Figure 12B:
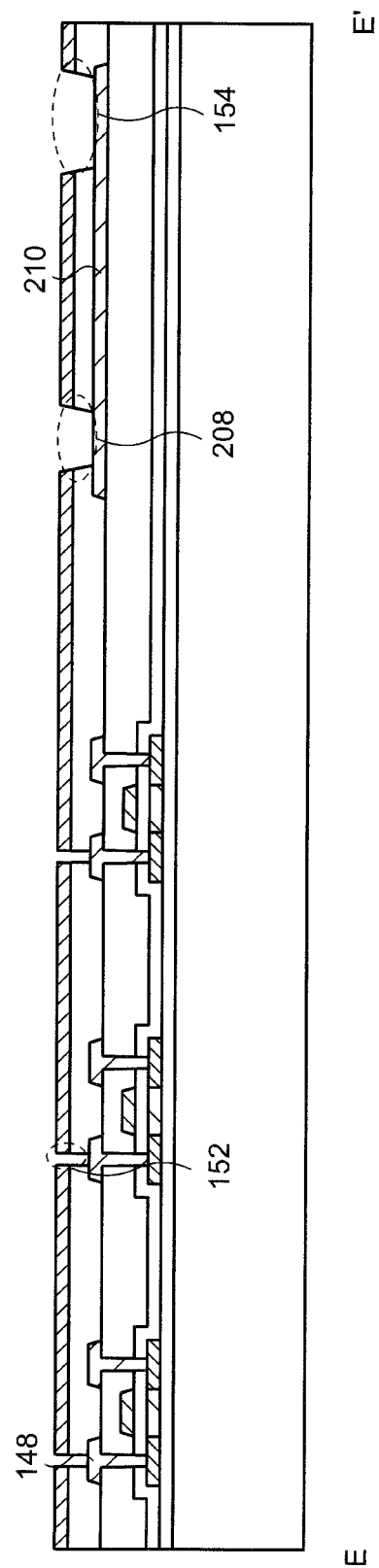
FIG. 12B is a schematic sectional view illustrating the method for manufacturing the display device according to the second embodiment of the present invention.
Figure 13A:
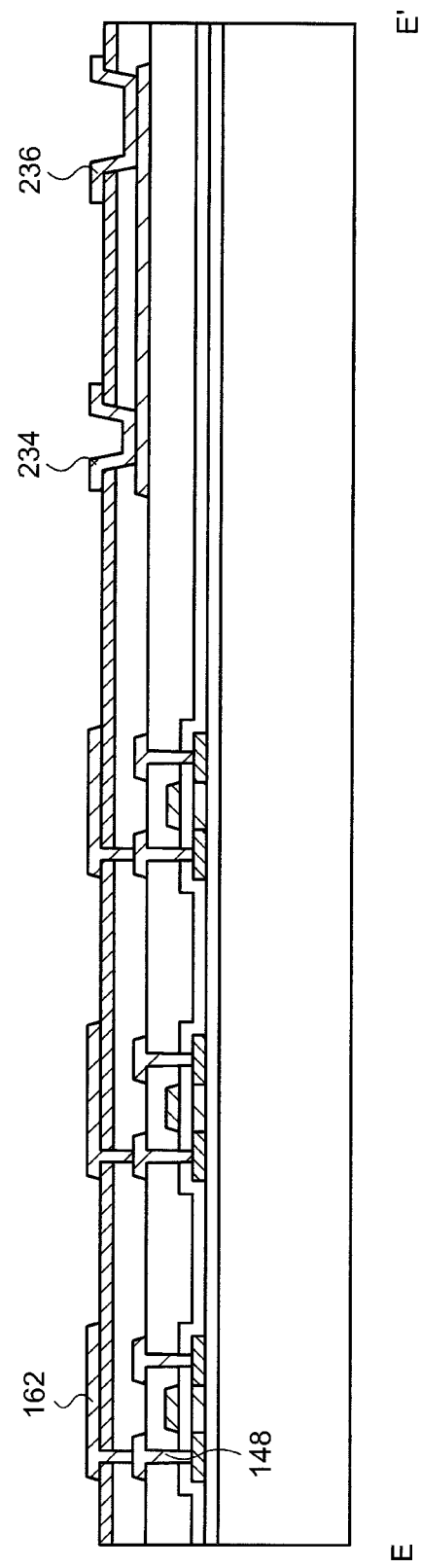
FIG. 13A is a schematic sectional view illustrating the method for manufacturing the display device according to the second embodiment of the present invention.

As illustrated in FIG. 12B, the inorganic insulating film 150 and the flattening film 114 are etched using the source/drain electrode 148 and the first terminal wiring 210 as an etching stopper, to form an opening 154 and contact holes 152 and 208. Then, the first electrode 162 and connection electrodes 234 and 236 are formed to cover the opening 154 or the contact holes 152 and 208 (FIG. 13A).

A region where the connection electrode 236 is formed, i.e., the opening 154 becomes a region to which a connector 214 such as an FPC is later connected via an anisotropic conductive film or the like. Thus, the region has a significantly larger area than that of a region where the connection electrode 234 is formed, i.e., the contact hole 208. The former is of a size such as a width of 10 μm to 50 μm and a length of 1 mm to 2 mm, which varies depending on a terminal pitch of the connector 214, for example. On the other hand, the latter is sufficient if it is a square or a rectangle one side of which is approximately several micrometers to several tens of micrometers. Miniaturization is restricted in a process for mounting the connector 214 for the opening 154. However, the contact hole 208 may be minimized enough for conductive layers (the first terminal wiring 210, the connection wiring 234, and the first wiring 206) to be connected with a sufficiently low contact resistance.

If emitted light from the light emitting element 160 is extracted from a second electrode 166, the first electrode 162 is configured to reflect visible light. In this case, the first electrode 162 uses a metal having a high reflectivity such as silver or aluminum or its alloy. Alternatively, a film containing a conductive oxide having a translucent property is formed on a film containing the metal or the alloy. Examples of the conductive oxide include an ITO and an IZO. If emitted light from the light emitting element 160 is extracted from the first electrode 162, the first electrode 162 may be formed using an ITO, an IZO, or the like.

In the present embodiment, the first electrode 162 and the connection electrodes 234 and 236 are formed on the inorganic insulating film 150. Therefore, the first electrode 162 and the connection electrodes 234 and 236 can be formed by forming a film containing the above-described metal to cover the opening 154 and the contact holes 152 and 208, for example, then forming a film containing a conductive oxide, which transmits visible light, and performing etching processing. Alternatively, the conductive oxide film, the metal film, and the conductive oxide film may be sequentially stacked to cover the opening 154 and the contact holes 152 and 208, followed by etching processing. Alternatively, after a conductive oxide is formed to cover the opening 154 and the contact holes 152 and 208, a stacked film of the conductive oxide film, the metal film, and the conductive oxide film may be formed to selectively cover the contact hole 152.

Figure 13B:
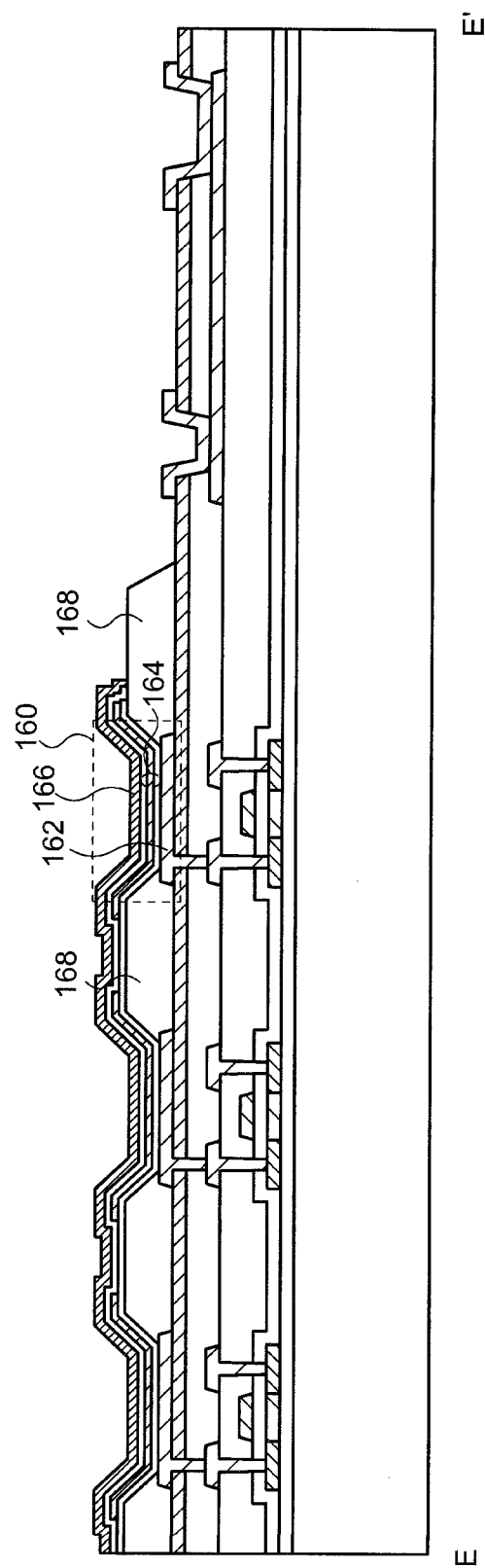
FIG. 13B is a schematic sectional view illustrating the method for manufacturing the display device according to the second embodiment of the present invention.

A partition wall 168 is then formed to cover an end of the first electrode 162 (FIG. 13B). The partition wall 168 can suppress an influence of a step caused by the first electrode 162 or the like and electrically insulate the first electrodes 162 in adjacent sub-pixels. The partition wall 168 can be formed by a wet film formation method using a material, which is usable in the flattening film 114, such as epoxy resin or acrylic resin.

Then, a functional layer 164 and a second electrode 166 in the light emitting element 160 are formed to cover the first electrode 162 and the partition wall 168 (FIG. 13B). The functional layer 164 mainly contains an organic compound, and can be formed by applying a wet film formation method such as an ink jet method or a spin coating method or a dray film formation method such as evaporation.

If emitted light from the light emitting element 160 is extracted from the first electrode 162, a metal such as aluminum, magnesium, or silver or its alloy may be used as the second electrode 166. On the other hand, emitted light from the light emitting element 160 is extracted from the second electrode 166, a conductive oxide having a translucent property such as an ITO may be used as the second electrode 166. Alternatively, the above-described metal can be formed to be thick enough to transmit visible light. In this case, a conductive oxide having a translucent property may be further stacked.

Figure 14A:
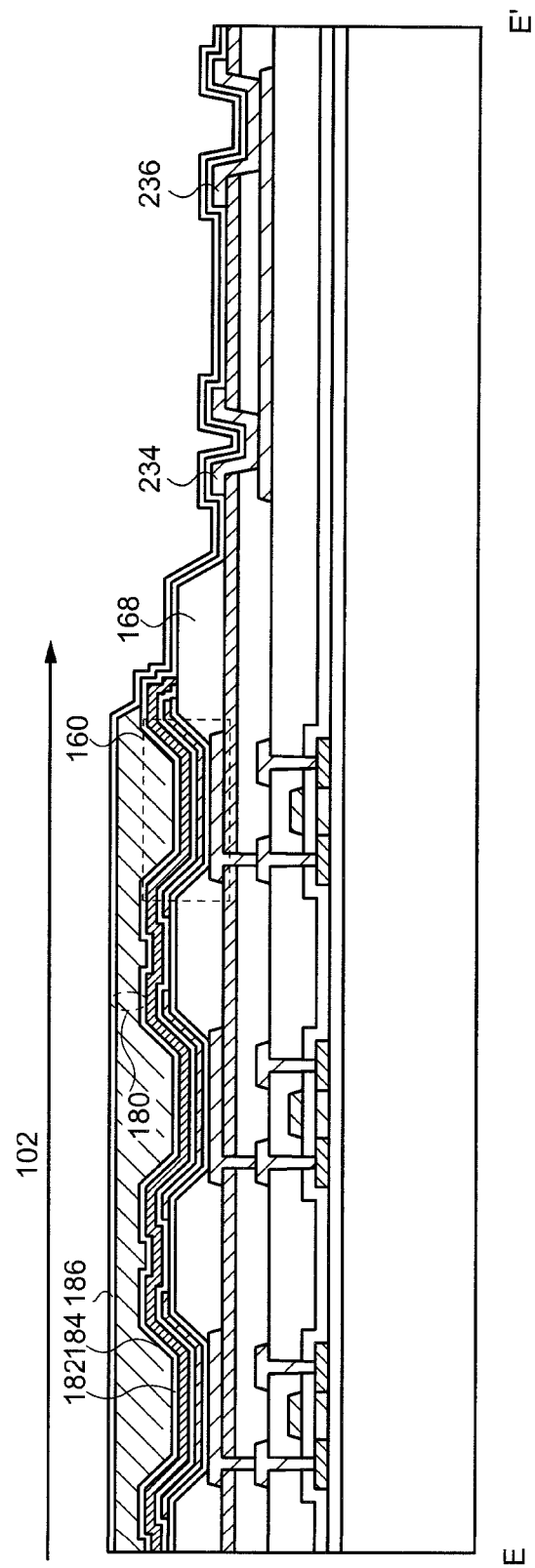
FIG. 14A is a schematic sectional view illustrating the method for manufacturing the display device according to the second embodiment of the present invention.

A sealing film 180 is then formed. As illustrated in FIG. 14A, a first inorganic film 182 is first formed to cover the light emitting element 160 and the connection electrodes 234 and 236. The first inorganic film 182 can contain an inorganic material such as a silicon nitride, a silicon oxide, a silicon nitroxide, or a silicon oxynitride, for example, and can be formed using a similar method to that for forming the base film 106.

An organic film 184 is then formed (FIG. 14A). The organic film 184 can contain organic resin including, for example, acrylic resin, polysiloxane, polyimide, or polyester. As illustrated in FIG. 14A, the organic film 184 may be formed in such a thickness as to suppress an influence of unevenness caused by the partition wall 168 and form a flat surface. The organic film 184 is preferably selectively formed within the display region 102. That is, the organic film 184 is preferably formed not to overlap the connection electrodes 234 and 236. The organic film 184 can be formed by a wet film formation method such as an ink jet method. Alternatively, the organic film 184 may be formed by bringing oligomer serving as a raw material of the above-described high-polymer material into the form of a mist or the form of a gas under reduced pressure, spraying the oligomer onto the first inorganic film 182, and then polymerizing the oligomer.

Then, a second organic film 186 is formed (FIG. 14A). The second inorganic film 186 has a similar structure to that of the first inorganic film 182, and can be formed using a similar method to that for forming the first inorganic film 182. The second inorganic film 186 can also be formed to cover not only the organic film 184 but also the connection electrodes 234 and 236. Thus, the organic film 184 can be sealed by the first inorganic film 182 and the second inorganic film 186.

Figure 14B:
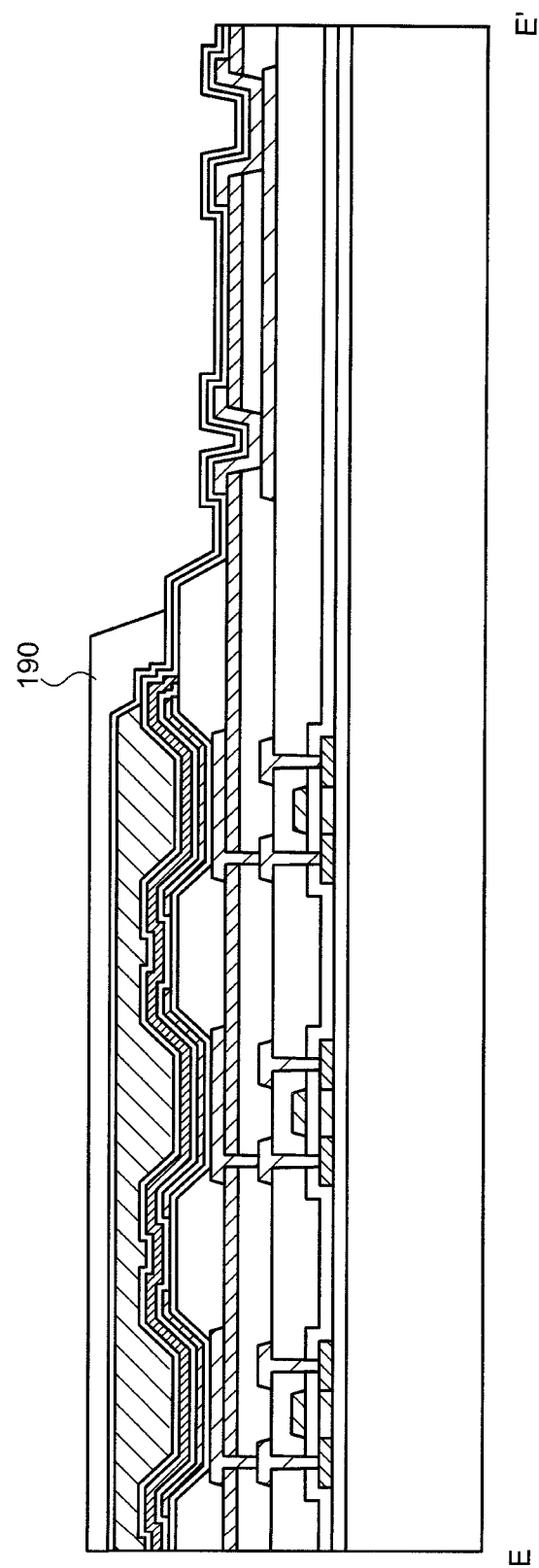
FIG. 14B is a schematic sectional view illustrating the method for manufacturing the display device according to the second embodiment of the present invention.

Then, an organic insulating film 190 is formed (FIG. 14B). The organic insulating film 190 can contain a similar material to that for the organic film 184 in the sealing film 180, and can be formed using a similar method to that for forming the organic film 184. As illustrated in FIG. 14B, the organic insulating film 190 selectively covers the inside of the display region 102. The organic insulating film 190 is preferably formed to cover a region where the first inorganic film 182 and the second inorganic film 186 contact each other and not to overlap the connection electrodes 234 and 236. At this time, a concave portion is formed in the organic insulating film 190 so that a concave portion is formed in each of first touch electrodes 202 formed on the organic insulating film 190. Then, the first inorganic film 182 and the second inorganic film 186, which are exposed from the organic insulating film 190, are removed by etching using the organic insulating film 190 as a mask (FIG. 15A). Thus, the connection electrodes 234 and 236 are respectively exposed in the contact hole 208 and the opening 154 arranged outside the display region 102. At this time, the inorganic insulating film 150 may also be partially etched so that the thickness thereof decreases.

A first layer 110 is formed through the foregoing processes.

[2. Second Layer]

Figure 15B:
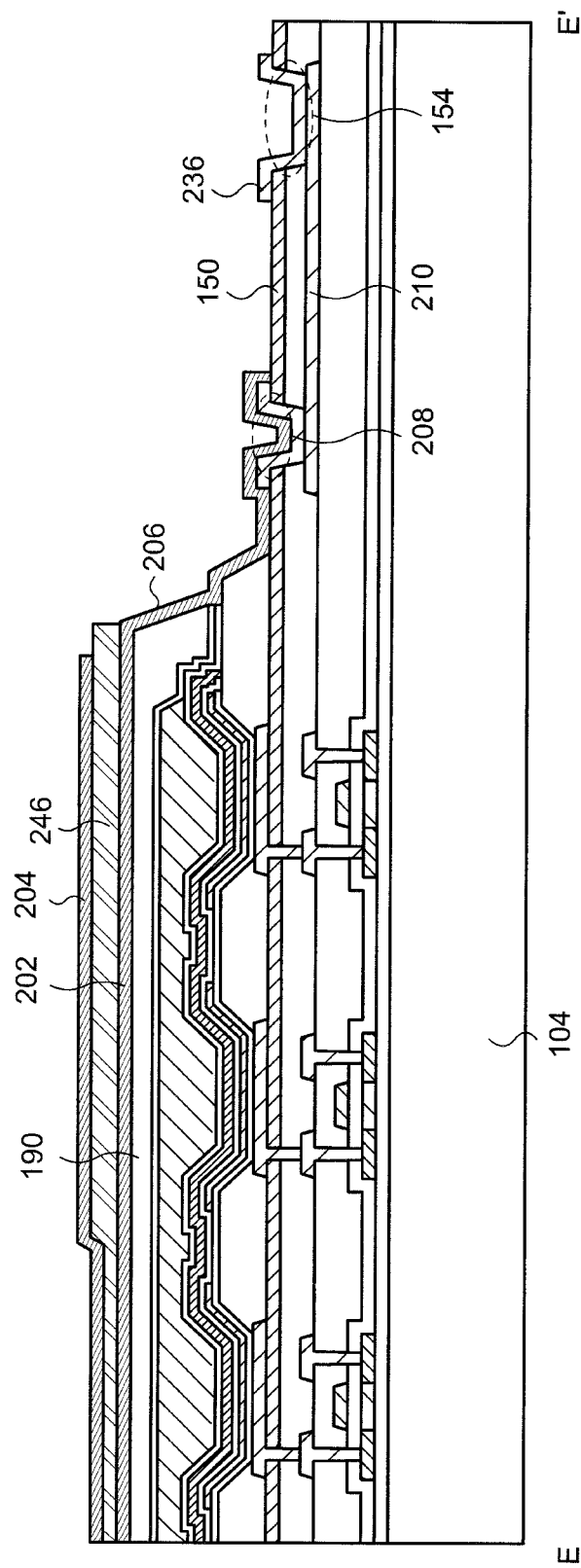
FIG. 15B is a schematic sectional view illustrating the method for manufacturing the display device according to the second embodiment of the present invention.

Then, a second layer 112 including a touch sensor 200 is formed. More specifically, a first touch electrode 202 is formed on the organic insulating film 190 (FIG. 15B). The above-described concave portion (FIGS. 5B and 8B) is formed in the organic insulating film 190. Thus, a concave portion is formed in the first touch electrode 202 according to the concave portion. The first touch electrode 202 may contain a conductive oxide having a translucent property as a main component. Examples of the conductive oxide include an ITO and an IZO.

A first wiring 206 is formed at the same time that the first touch electrode 202 is formed. The first wiring 206 is formed to cover the contact hole 208. Thus, the first touch electrode 202 and a first terminal wiring 210 are electrically connected to each other (FIG. 15B).

Then, an interlayer insulating film 246 is formed on the first touch electrode 202 (FIG. 15B). The interlayer insulating film 246 can be formed using a similar material and a similar method to those for forming the organic film 184. The interlayer insulating film 246 differs from the flattening film 114 or the like in that high-temperature processing is not performed when back processing is performed, for example. The functional layer 164 containing the organic compound has already been formed at this time point. Therefore, processing is desirably performed under a sufficient temperature for the organic compound not to be decomposed. At this time, a concave portion is formed in the organic insulating film 190 so that a concave portion is formed in each of second touch electrodes 204 formed on the interlayer insulating film 246.

As an example of another method for forming the interlayer insulating film 246, a sheet-shaped interlayer insulating film 246 may be previously formed and then stuck to cover the plurality of first touch electrodes 202. At this time, a concave portion can be formed in the interlayer insulating film 246 by mold processing, for example. Thus, even a concave portion having a shape, which is difficult to form in a photolithography process, can be easily formed. For example, a concave portion having a parabolic cross-sectional shape illustrated in FIGS. 8A and 8B can be more easily formed in this method than in the photolithography process.

Then, the second touch electrode 204 is formed on the interlayer insulating film 246 (FIG. 15B). At this time, the above-described concave portion is formed in the interlayer insulating film 246. Thus, a concave portion is formed in the second touch electrode 204 according to the concave portion.

The second layer 112 is formed by the foregoing processes.

[3. Other Layers]

Then, an insulating film 266, a circularly polarizing plate 260, and a cover film 268 are formed. When the connector 214 is then connected using an anisotropic conductive film 252 or the like in the opening 154, the display device 100 illustrated in FIG. 9 can be formed. The insulating film 266 can contain a high-polymer material such as polyester, epoxy resin, or acrylic resin, and can be formed using a printing method or a lamination method. The cover film 268 can also contain a similar high-polymer material to that contained in the insulating film 266, and a high-polymer material such as polyolefin or polyimide can also be applied thereto in addition to the above-described high-polymer material.

If the display device 100 has the flexibility, after the connector 214 is formed, the circularly polarizing plate 260 is formed, or the insulating film 266 is formed, for example, light such as a laser may be irradiated from the side of the substrate 104, to decrease an adhesive force between the substrate 104 and the base material, and then strip the substrate 104 on an interface therebetween using a physical force, which is not illustrated.

As described in the present embodiment, the touch sensor 200 includes the plurality of first touch electrodes 202 and the plurality of second touch electrodes 204. Each of the plurality of first touch electrodes 202 and the plurality of second touch electrodes 204 is a strip-shaped wiring having a concave portion, and the wiring can be formed by a photolithography process. Therefore, the first touch electrodes 202 and the second touch electrodes 204 each having a precise layout can be formed.

(Third Embodiment)

[1. Entire Configuration]

Figure 16:
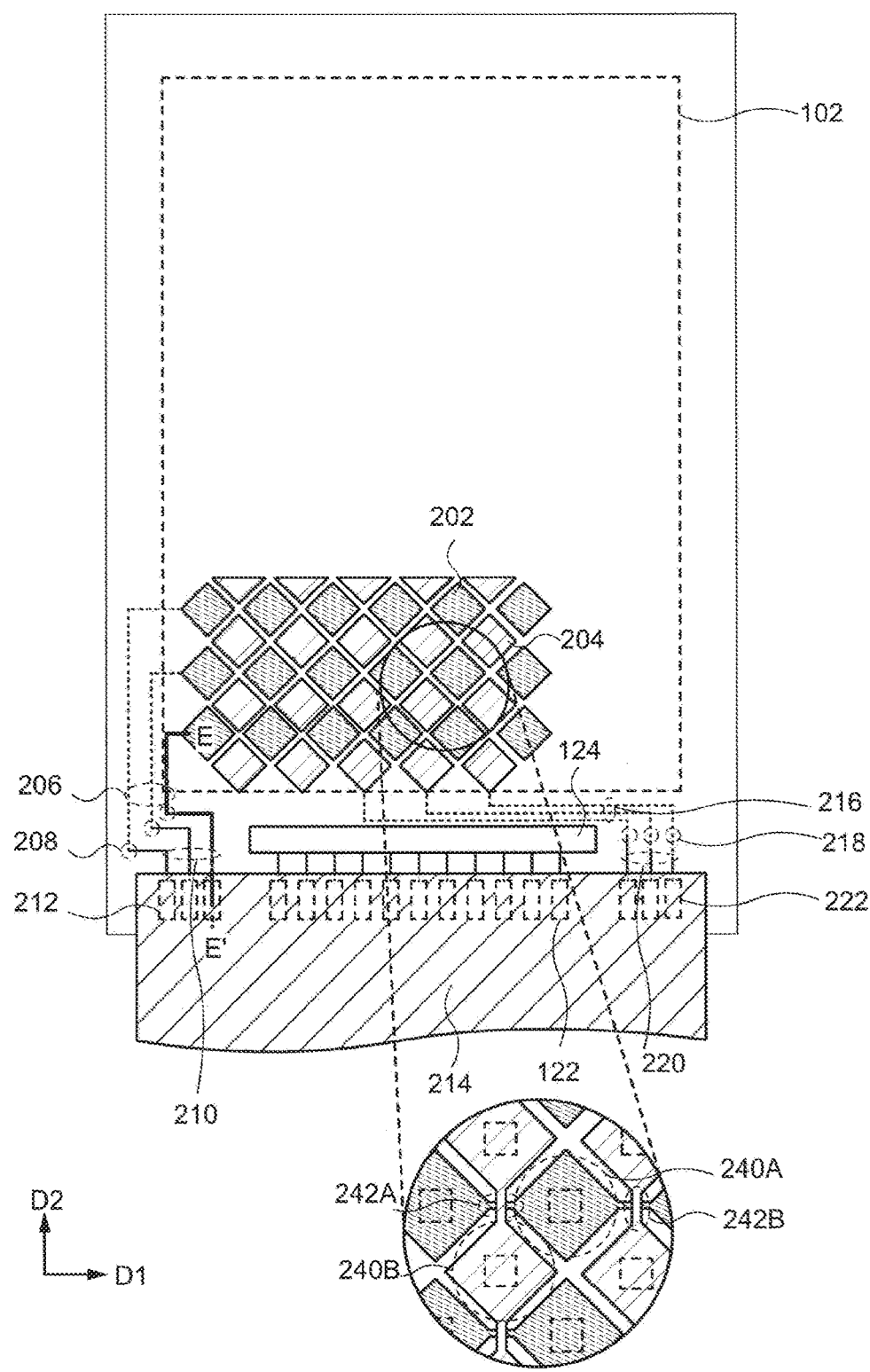
FIG. 16 is a schematic top view of a display device according to a third embodiment of the present invention.
Figure 17:
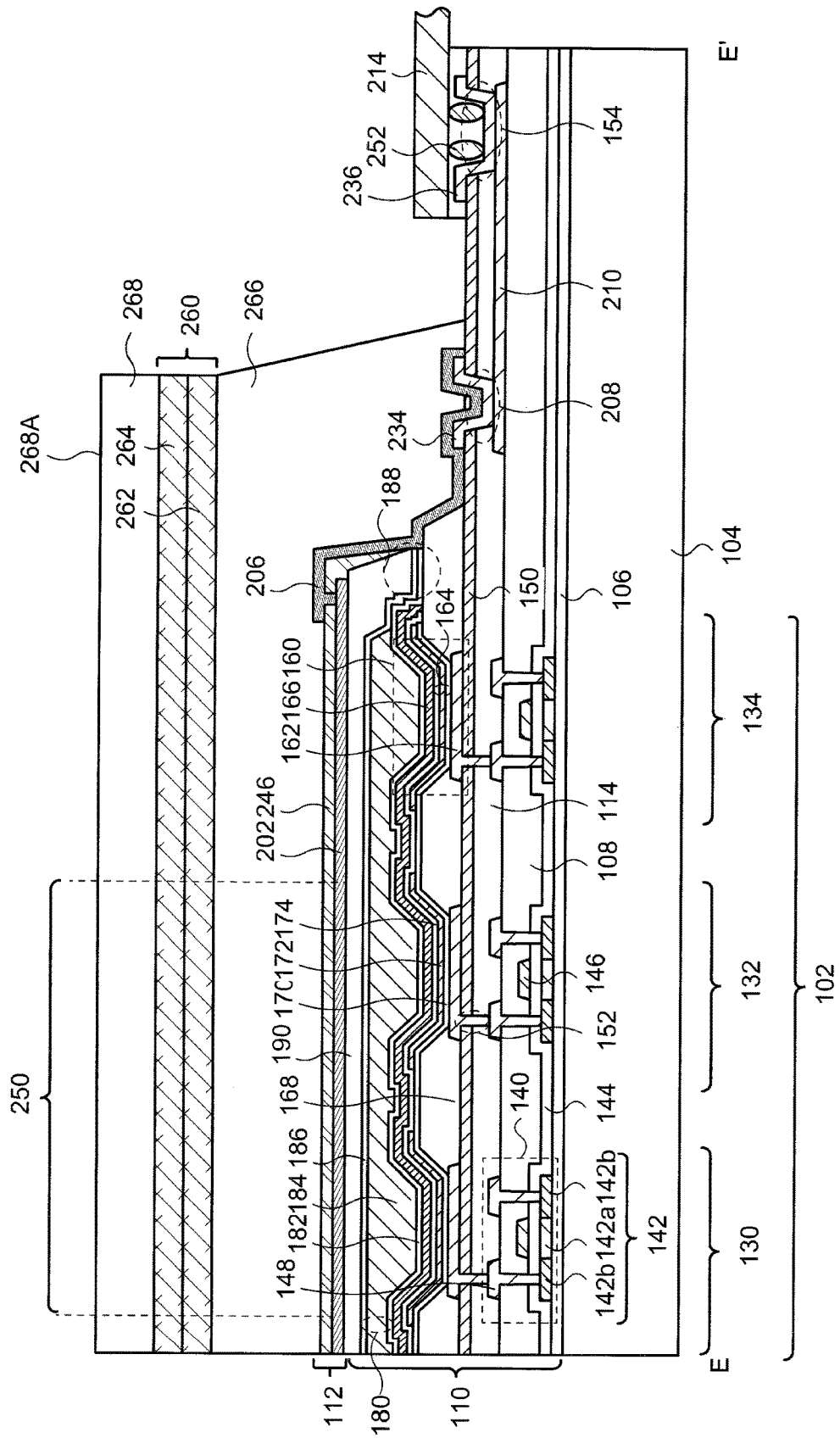
FIG. 17 is a schematic sectional view of the display device according to the third embodiment of the present invention.

FIG. 16 is a schematic top view of a display device loaded with a touch or proximity sensor (hereinafter merely referred to as a display device) 300 according to a third embodiment of the present invention. FIG. 17 schematically illustrates a cross section along a chain line E-E' illustrated in FIG. 16 and leading to a first wiring 206, a first terminal wiring 210, and a first terminal 212 from a display region 102.

The display device 300 according to the present embodiment differs from the display device 100 according to the first embodiment in a configuration of a second layer 112. The second layer 112 includes a plurality of first touch electrodes 202 arranged in a stripe shape in a row direction and a plurality of second touch electrodes 204 arranged in a stripe shape in a column direction and respectively intersecting the first touch electrodes 202. The plurality of first touch electrodes 202 and the plurality of second touch electrodes 204 form a touch sensor 200.

Figure 18:
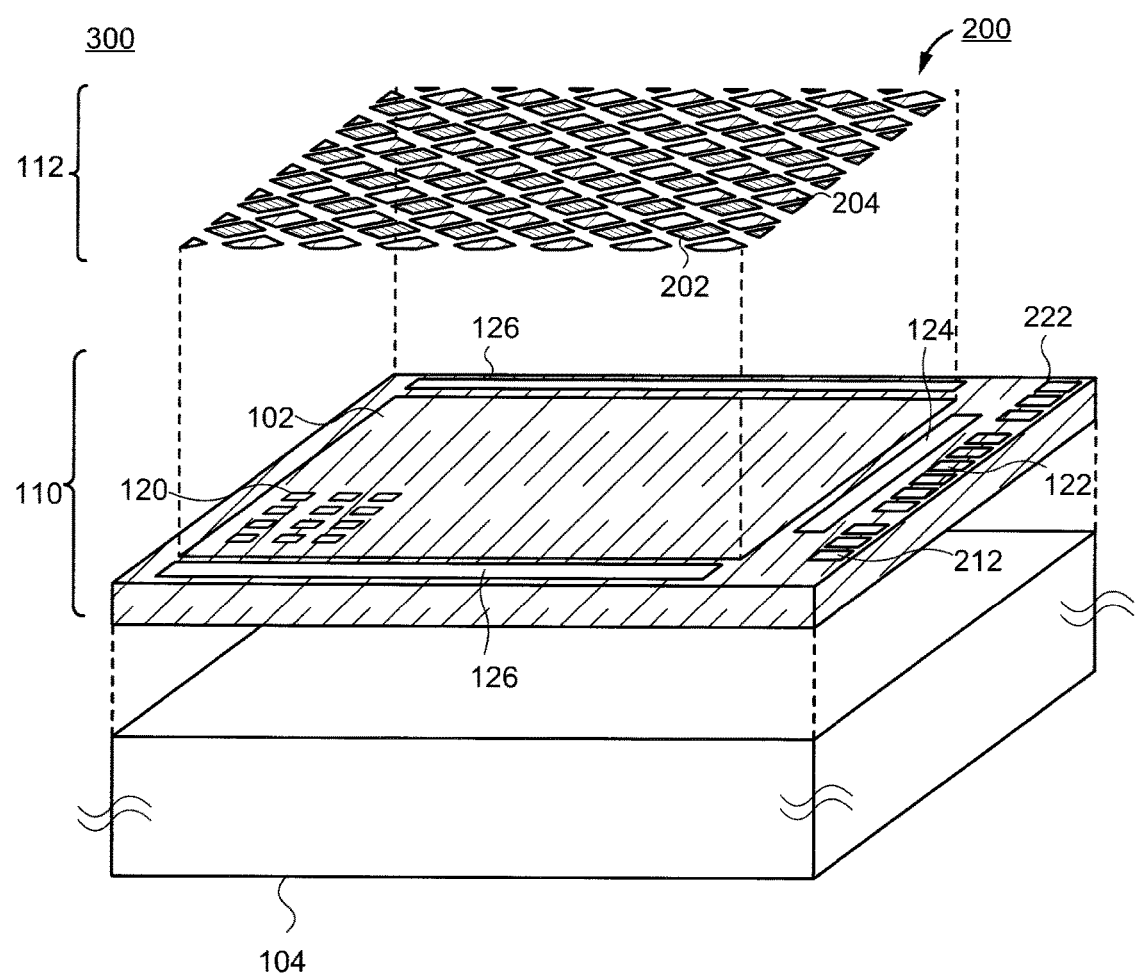
FIG. 18 is a schematic view illustrating a configuration of the display device according to the third embodiment of the present invention.

FIG. 18 is a schematic perspective view of the display device 300. To promote an understanding, a substrate 104, a first layer 110 including the display region 102, and a second layer 112 including the touch sensor 200 are illustrated to separate from one another. Also in the present embodiment, a surface, on the side on which the first layer 110 and the second layer 112 are arranged, of the substrate 104 in the touch sensor 200 is referred to as a "front surface", and a surface on the opposite side thereof is referred to as a "rear surface".

[2. Touch Electrode]

FIG. 16 illustrates a partial region of the touch sensor 200 in an enlarged manner. As illustrated in FIG. 16, the first touch electrodes 202 respectively include a plurality of first sensor electrodes 240A and a plurality of connection regions 242A. In the first touch electrodes 202, the first sensor electrodes 240A and the connection regions 242A are alternately arranged. The second touch electrodes 204 respectively include a plurality of second sensor electrodes 240B and a plurality of connection regions 242B. In the second touch electrodes 204, the second sensor electrodes 240B and the connection regions 242B are alternately arranged. While each of the first sensor electrodes 240A and the second sensor electrodes 240B has a substantially square shape, it may have another shape. The plurality of second touch electrodes 204 are respectively spaced apart from the plurality of first touch electrodes 202, and are electrically independent of one another. Thus, the plurality of second touch electrodes 204 are respectively insulated from the plurality of first touch electrodes 202.

The display device 300 according to the present embodiment includes the plurality of first touch electrodes 202 arranged in a second direction D2 and the plurality of second touch electrodes 204 arranged in a first direction D1. The plurality of first touch electrodes 202 respectively include the plurality of first sensor electrodes 240A provided on an insulating surface, arranged in the first direction D1, and electrically connected to one another. The plurality of second touch electrodes 204 respectively include the plurality of second sensor electrodes 240B provided on the insulating surface, arranged in the second direction D2, and electrically connected to one another. The plurality of first sensor electrodes 240A adjacent to one another in the second direction D2 are spaced apart from one another. The plurality of second sensor electrodes 240B adjacent to one another in the first direction D1 are spaced apart from one another. Each of the plurality of first sensor electrodes 240A and each of the plurality of second sensor electrodes 240B respectively have concave surface on the detection surface side. That is, each of the plurality of first sensor electrodes 240A and the plurality of second sensor electrodes 240B has a concave portion on its surface on the front surface side. In each of the plurality of first sensor electrodes 240A and the plurality of second sensor electrodes 240B, the concave portion is provided roughly at the center in a width direction. Therefore, each of the plurality of first sensor electrodes 240A and the plurality of second sensor electrodes 240B includes a top surface part, a sidewall part, and a bottom surface part. In each of the plurality of first sensor electrodes 240A and the plurality of second sensor electrodes 240B, the top surface part is not essential. Each of the plurality of first sensor electrodes 240A and the plurality of second sensor electrodes 240B may have a region that is concave toward the front surface side (convex toward the rear surface side).

Even if the display device 300 has the above-described configuration, a detection sensitivity of a detection target not contacting a front surface of a touch panel and a detection accuracy of coordinates of the detection target projected onto the front surface of the tach panel can be improved as with the display device 100 according to the first embodiment.

Figure 19A:
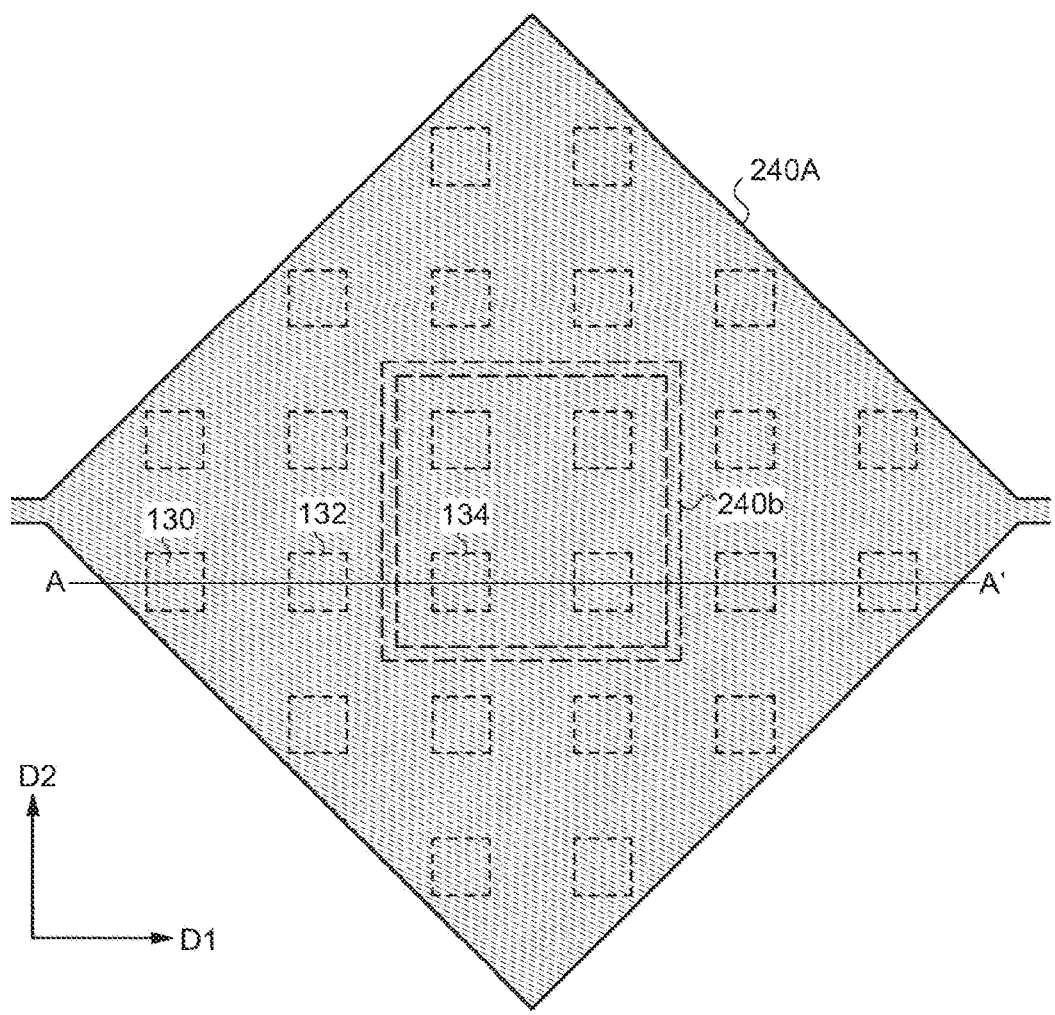
FIG. 19A is a top view of a sensor electrode in the display device according to the third embodiment of the present invention.
Figure 19B:
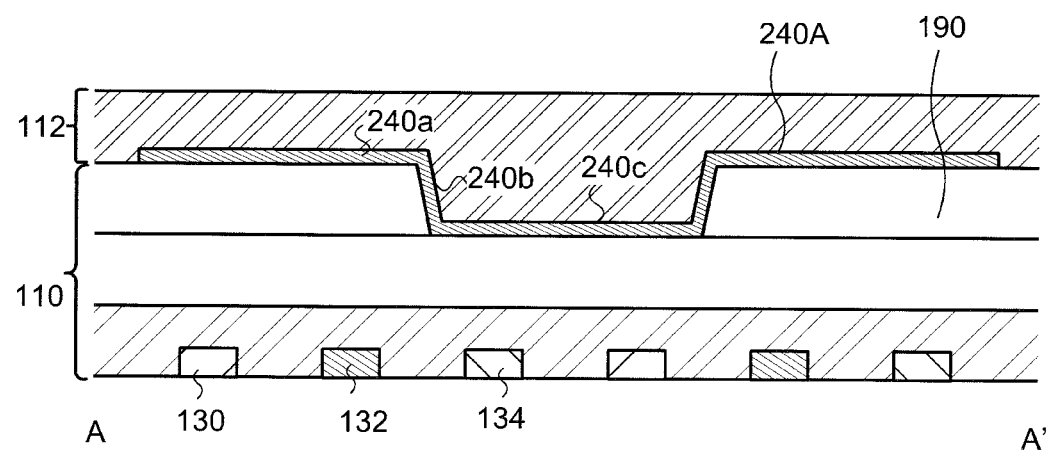
FIG. 19B is a schematic sectional view of the sensor electrode in the display device according to the third embodiment of the present invention.

FIG. 19A is an enlarged top view of the first sensor electrode 240A, and FIG. 19B schematically illustrates a cross section of the first sensor electrode 240A. The first sensor electrode 240A has a concave portion. Therefore, the first sensor electrode 240A includes a top surface part 240a, a sidewall part 240b, and a bottom surface part 240c. The sidewall part 240b is arranged in a square shape along a partition wall arranged between adjacent pixels in a planar view. In this example, the sidewall part 240b is arranged to surround four sub-pixels roughly at the center of the first sensor electrode 240A. A similar configuration to that of the first sensor electrode 240A can also be adopted for the second sensor electrode 240B.

A layout of the concave portions in the touch electrodes is not limited to that in the above-described example. As another example, the sidewall part 240b may be arranged in a polygonal shape along the partition wall in a planar view.

Alternatively, a plurality of concave portions may be provided in the one touch electrode. Such configurations enable the surface area of the touch electrode to be made larger and enable a stronger electric field to be formed at a position spaced apart from the touch electrode. Thus, the detection sensitivity of the detection target spaced apart from the front surface of the touch panel is further improved.

Figure 22A:
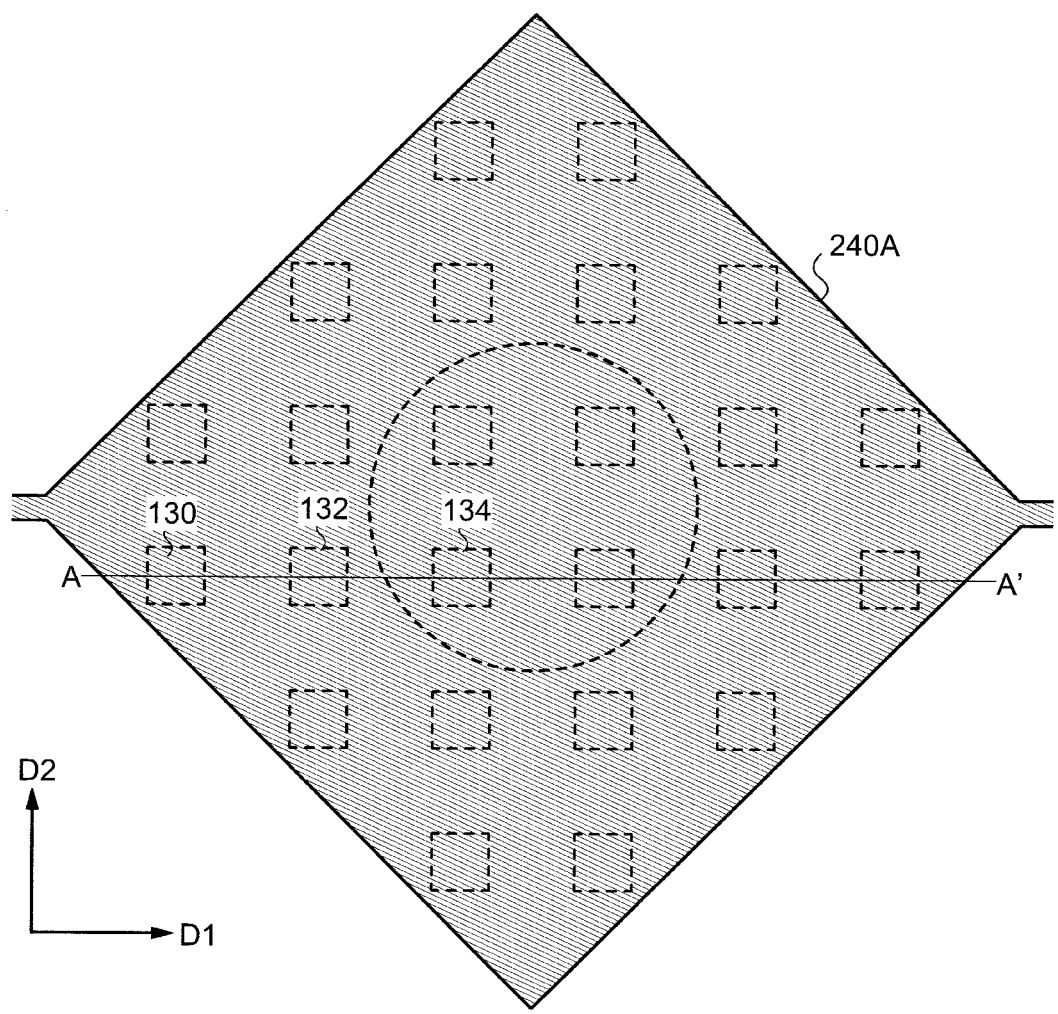
FIG. 22A is a top view of a sensor electrode in the display device according to the third embodiment of the present invention.
Figure 22B:
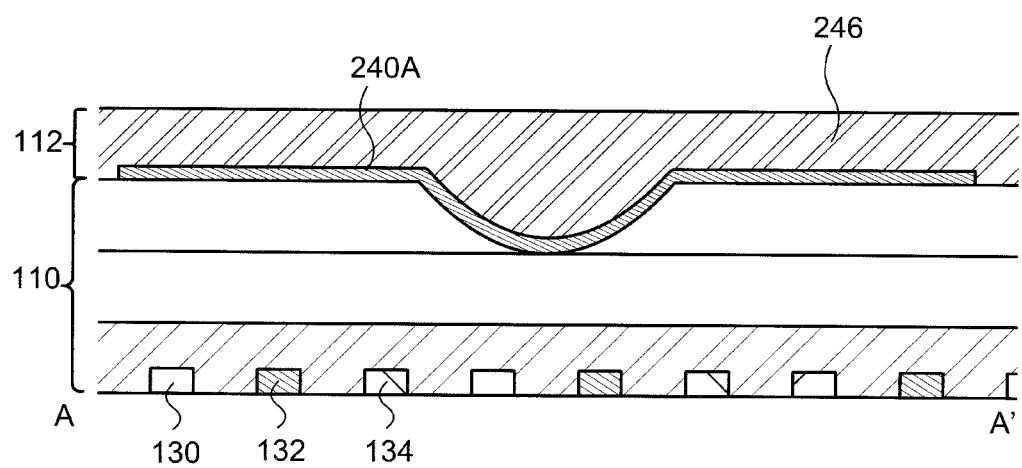
FIG. 22B is a schematic sectional view of the sensor electrode in the display device according to the third embodiment of the present invention.

As still another example, FIG. 22A is an enlarged top view of the first sensor electrode 240A, and FIG. 22B schematically illustrates a cross section of the first sensor electrode 240A. In this example, a concave portion of the first sensor electrode 240A has a circular shape in a planar view, as indicated by a circular broken line in FIG. 22A. In this example, the concave portion is arranged to surround four sub-pixels roughly at the center of the first sensor electrode 240A. The concave portion has a parabolic cross-sectional shape in a cross-sectional view, as illustrated in FIG. 22B. A similar configuration to that of the first sensor electrode 240A can be similarly adopted for the second sensor electrode 240B. Such a configuration enables a stronger electric field to be formed at a position spaced apart from the touch electrode. Thus, the detection sensitivity of the detection target spaced apart from the front surface of the touch panel is improved. Further, such a configuration further inhibits electric lines of force emitted (or absolved) by each of the touch electrodes from being dispersed in a direction parallel to the front surface of the touch panel. Thus, the detection accuracy of the coordinates of the detection target projected onto the front surface of the touch panel is further improved.

Figure 20:
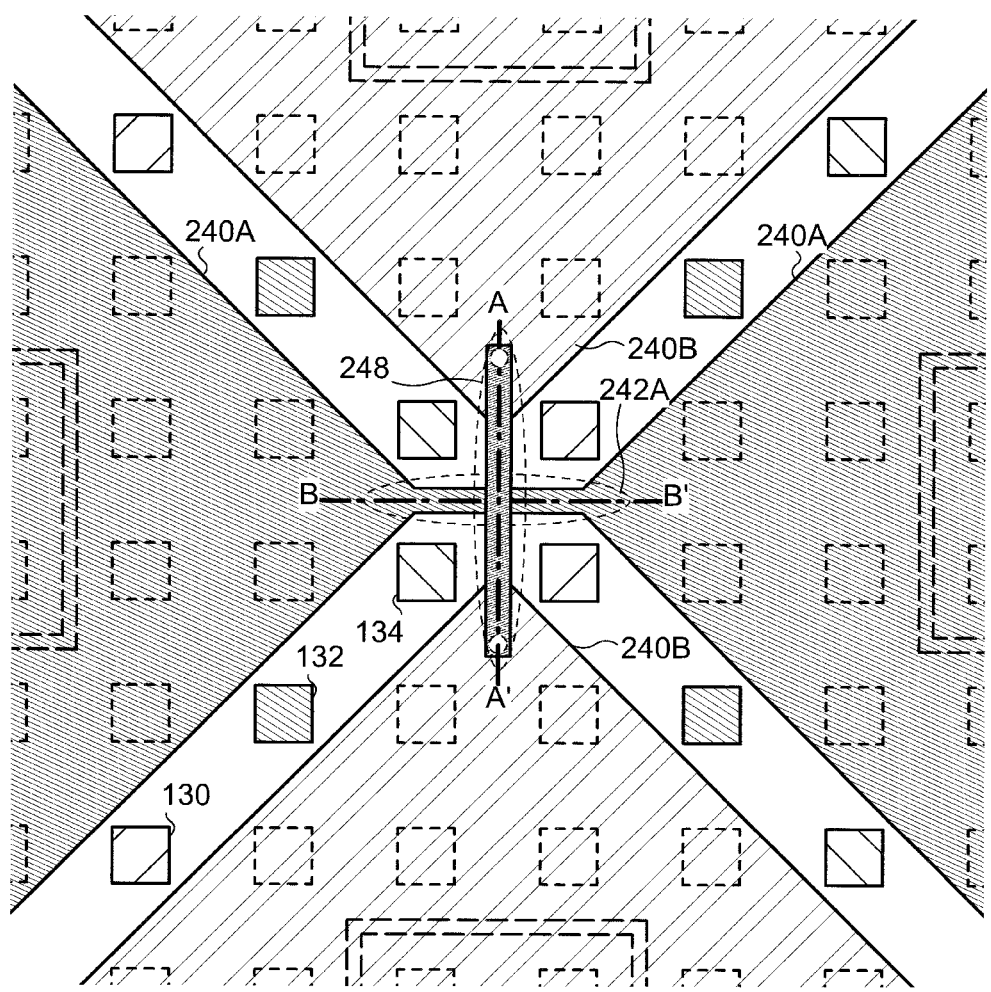
FIG. 20 is a schematic top view of touch electrodes in the display device according to the third embodiment of the present invention.
Figure 21A:
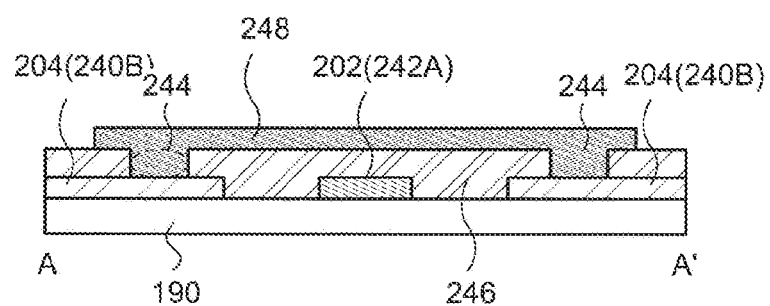
FIG. 21A is a schematic sectional view of the touch electrodes in the display device according to the third embodiment of the present invention.
Figure 21B:
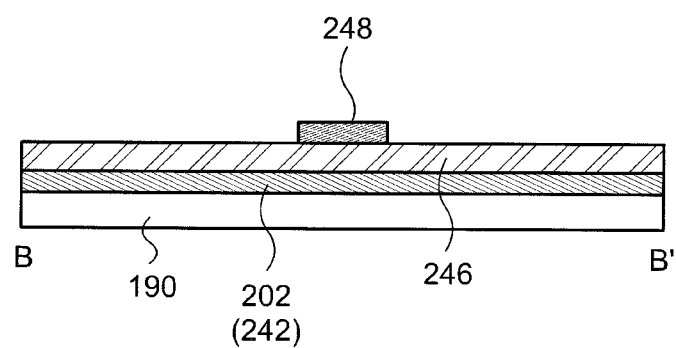
FIG. 21B is a schematic sectional view of the touch electrode in the display device according to the third embodiment of the present invention.

FIG. 20 is an enlarged top view schematically illustrating the vicinity of a position at which the first touch electrode 202 and the second touch electrode 204 intersect each other. FIG. 21A illustrates a cross section along a chain line A-A' illustrated in FIG. 20, and FIG. 21 B illustrates a cross section along a chain line B-B' illustrated in FIG. 20. As illustrated in FIGS. 21A and 21B, the first sensor electrode 240A, the second sensor electrode 240B, and the connection region 242A are all provided on an organic insulating film 190 (described below). The first sensor electrode 240A and the second sensor electrode 240B may contact the organic insulating film 190. The first sensor electrode 240A and the second sensor electrode 240B can exist within the same layer. When the first sensor electrode 240A and the second sensor electrode 240B are provided within the same layer, their respective optical characteristics such as reflection characteristics become substantially the same. As a result, the first sensor electrode 240A and the second sensor electrode 240B become difficult to visually recognize, i.e., the first sensor electrode 240A and the second sensor electrode 240B can be made inconspicuous.

An interlayer insulating film 246 is provided on the first touch electrodes 202 (the connection regions 242A), and a bridge wiring 248 is formed on the interlayer insulating film 246. The bridge wiring 248 is electrically connected to the adjacent two second sensor electrodes 240B, respectively, in openings 244 provided within the interlayer insulating film 246. Therefore, the bridge wiring 248 can be recognized as the connection region 242B (FIG. 16) between the second sensor electrodes 240B. The interlayer insulating film 246 also functions as a dielectric body for electrically insulating the first sensor electrode 240A and the second sensor electrode 240B and forming a capacitance between the first sensor electrode 240A and the second sensor electrode 240B.

In a configuration illustrated in FIGS. 20, 21A, and 21B, an example in which the second sensor electrodes 240B are formed on the first sensor electrodes 240A and the bridge wiring 248 electrically connects the second sensor electrodes 240B to each other is illustrated. Instead of this, a configuration in which the first sensor electrodes 240A are formed on the second sensor electrodes 240B and the bridge wiring 248 electrically connects the first sensor electrodes 240A to each other may be used.

<1. Second Layer>

The second layer 112 including the first touch electrodes 202 and the second touch electrodes 204 will be specifically described. The second layer 112 includes the first touch electrodes 202, the second touch electrodes 204, the interlayer insulating film 246, the bridge wiring 248, the first wiring 206, a second wiring 216, and the like.

The first sensor electrodes 240A and the second sensor electrodes 240B are formed on the insulating surface, and are formed on the organic insulating film 190 in the present embodiment. The first sensor electrodes 240A and the second sensor electrodes 240B may directly contact the organic insulating film 190. The plurality of first sensor electrodes 240A adjacent to one another in the first direction D1 are connected to one another, and the plurality of first sensor electrodes 240B adjacent to one another in the second direction D2 are insulated from one another. The plurality of second sensor electrodes 240B adjacent to one another in the second direction D2 are connected to one another, and the plurality of second sensor electrodes 240B adjacent to one another in the first direction D1 are insulated from one another.

As illustrated in FIGS. 19A, 19B, and 20, the organic insulating film 190 has a plurality of concave portions covering a plurality of pixels arranged in a matrix shape and arranged in a matrix shape in the first direction D1 and the second direction D2 intersecting the first direction D1. The plurality of first sensor electrodes 240A and the plurality of second sensor electrodes 240B are arranged on the organic insulating film 190, and are provided to each cover any one of the plurality of concave portions. Each of the plurality of first sensor electrodes 240A and the plurality of second sensor electrodes 240B has a concave surface according to the concave portion.

The interlayer insulating film 246 is formed to contact the first touch electrodes 202 (the connection regions 242A) and cover the first touch electrodes 202 (the connection regions 242A). An opening is formed within the interlayer insulating film 246, and the first wiring 206 is provided to cover the opening. The first wiring 206 extends to a contact hole 208 via a portion outside the display region 102 (see FIG. 16). The first wiring 206 is further electrically connected to the first terminal wiring 210 existing in the same layer as that in which a source/drain electrode 148 (or a gate electrode 146) in a transistor 140 exists via a connection electrode 234 in the contact hole 208. Thus, the first touch electrode 202 and the first terminal wiring 210 are electrically connected to each other.

If the first sensor electrodes 240A and the second sensor electrodes 240B are formed in the same layer, like in the present embodiment, either the first sensor electrodes 240A or the second sensor electrodes 240B can be connected to each other by the bridge wiring 248 (see FIGS. 20, 21A, and 21B). In this case, the first wiring 206 can exist within the same layer as that in which the bridge wiring 248 exists. Therefore, the first wiring 206 and the bridge wiring 248 can be simultaneously formed.

In the above-described embodiments 1 and 2, all the plurality of first touch electrodes 202 need not respectively have concave surfaces, but at least one of them may respectively have concave surfaces. All the plurality of second touch electrodes 204 need not respectively have concave surfaces, but at least one of them may respectively have concave surfaces.

In the above-described third embodiment, all the plurality of first sensor electrodes 240A included in the first touch electrodes 202 need not respectively have concave surfaces, but at least one of them may respectively have concave surfaces. All the plurality of second sensor electrodes 240B included in the second touch electrodes 204 need not respectively have concave surfaces, but at least one of them may respectively have concave surfaces.

The above-described embodiments can be implemented in combination, as needed, as long as they are mutually consistent. While addition, deletion, or design change of a component or components or addition, deletion, or condition change of a process or processes performed, as needed, by a person skilled in the art based on the display device according to each of the embodiments is also included in the scope of the present invention without departing from the spirit of the present invention.

While in the specification, a case of an EL display device is mainly illustrated as a disclosure example, other applications include all flat panel display devices such as a self-luminous display device, a liquid crystal display device, and an electronic paper display device including an electrophoresis element. The present disclosure is applicable, but is not particularly limited to, the display devices of a small and medium size to a large size.

Another function and effect different from the function and effect achieved by each of the above-described embodiments are naturally construed as being achieved from the present invention if they are clear from the description of the specification or readily predictable by a person skilled in the art.

What is claimed is:

1. A touch or proximity sensor comprising:
a plurality of first touch electrodes extending in a first direction and being arranged in a second direction intersecting the first direction; and
a plurality of second touch electrodes extending in the second direction, being arranged in the first direction, and insulated from the plurality of first touch electrodes,
wherein
each of the plurality of first touch electrodes includes a plurality of first sensor electrodes provided on an insulating surface, arranged in the first direction, and electrically connected to one another,
each of the plurality of second touch electrodes includes a plurality of second sensor electrodes provided on the insulating surface, arranged in the second direction, and electrically connected to one another,
each of the plurality of first sensor electrodes has a concave surface at a center portion on a detection surface side thereof,
each of the plurality of second sensor electrodes has a concave surface at a center portion on a detection surface side thereof,
the concave surface includes sidewall parts each of which is inclined, and a bottom surface part which is flat, and
the bottom surface part is between the sidewall parts.

2. The touch or proximity sensor according to claim 1, further comprising:
a first insulating film provided on the plurality of first touch electrodes, wherein the plurality of second touch electrodes are provided on the first insulating film.

3. The touch or proximity sensor according to claim 2, further comprising:
a second insulating film provided in a layer above the plurality of second touch electrodes,
wherein a refractive index of the second insulating film is substantially equal to a refractive index of the first insulating film.

4. The touch or proximity sensor according to claim 1, further comprising:
a second insulating film provided in a layer above the plurality of first sensor electrodes and the plurality of second sensor electrodes,
wherein the plurality of first sensor electrodes and the plurality of second sensor electrodes are provided on the first insulating film, and
a refractive index of the second insulating film is substantially equal to a refractive index of the first insulating film.

5. The touch or proximity sensor according to claim 1, further comprising:
a first insulating film having a plurality of concave portions arranged in a matrix shape in a first direction and a second direction intersecting the first direction, wherein
each of the plurality of first touch electrodes and each of the plurality of second touch electrodes respectively have concave surfaces according to the concave portions of the first insulating film.

6. The touch or proximity sensor according to claim 5, further comprising:
a second insulating film provided in a layer above the plurality of first touch electrodes and the plurality of second touch electrodes,
wherein a refractive index of the second insulating film is substantially equal to a refractive index of the first insulating film.

7. A display device comprising:
a plurality of pixels arranged in a matrix shape;
a plurality of first touch electrodes on the plurality of pixels, the plurality of first touch electrodes extending in a first direction and being arranged in a second direction intersecting the first direction; and
a plurality of second touch electrodes on the plurality of pixels, the plurality of second touch electrodes extending in the second direction, being arranged in the first direction, and insulated from the plurality of first touch electrodes,
wherein
each of the plurality of first touch electrodes includes a plurality of first sensor electrodes provided on an insulating surface, arranged in the first direction, and electrically connected to one another,
each of the plurality of second touch electrodes includes a plurality of second sensor electrodes provided on the insulating surface, arranged in the second direction, and electrically connected to one another,
each of the plurality of first sensor electrodes has a concave surface at a center portion on a detection surface side thereof,
each of the plurality of second sensor electrodes has a concave surface at a center portion on a detection surface side thereof,
the concave surface includes sidewall parts each of which is inclined, and a bottom surface part which is flat, and
the bottom surface part is between the sidewall parts.

8. The display device according to claim 7, further comprising:
a sealing film which covers the plurality of pixels; and
a first insulating film provided on the plurality of first touch electrodes,
wherein the plurality of first touch electrodes and the plurality of second touch electrodes are provided in a layer above the sealing film, and
the plurality of second touch electrodes are provided on the first insulating film.

9. The display device according to claim 8, further comprising:
a second insulating film provided in a layer above the plurality of first touch electrodes and the plurality of second touch electrodes,
wherein a refractive index of the second insulating film is substantially equal to a refractive index of the first insulating film.

10. The display device according to claim 7, further comprising:
a sealing film which covers the plurality of pixels,
wherein the plurality of first touch electrodes and the plurality of second touch electrodes are provided in a layer above the sealing film.

11. The display device according to claim 10, further comprising:
a second insulating film provided in a layer above the plurality of first touch electrodes and the plurality of second touch electrodes,
wherein a refractive index of the second insulating film is substantially equal to a refractive index of the first insulating film.

12. The display device according to claim 7, further comprising:
a first insulating film having a plurality of concave portions arranged in a matrix shape in a first direction and a second direction intersecting the first direction, wherein
each of the plurality of first touch electrodes and each of the plurality of second touch electrodes respectively have concave surfaces according to the concave portions of the first insulating film, and
the first insulating film is provided to cover the plurality of pixels.

13. The display device according to claim 12, further comprising:
a second insulating film provided in a layer above the plurality of first touch electrodes and the plurality of second touch electrodes,
wherein a refractive index of the second insulating film is substantially equal to a refractive index of the first insulating film.

* * * * *